US007119267B2

(12) United States Patent
Hirade et al.

(10) Patent No.: US 7,119,267 B2
(45) Date of Patent: Oct. 10, 2006

(54) PORTABLE MIXING RECORDER AND METHOD AND PROGRAM FOR CONTROLLING THE SAME

(75) Inventors: Seiji Hirade, Fukuroi (JP); Ryohsuke Ohtani, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/170,973

(22) Filed: Jun. 13, 2002

(65) Prior Publication Data

US 2002/0189426 A1 Dec. 19, 2002

(30) Foreign Application Priority Data

Jun. 15, 2001 (JP) ............................. 2001-181938
Sep. 3, 2001 (JP) ............................. 2001-265763
Sep. 3, 2001 (JP) ............................. 2001-265764

(51) Int. Cl.
*H04B 1/00* (2006.01)

(52) U.S. Cl. .......................... 84/602; 84/603; 381/119

(58) Field of Classification Search .......... 84/600–609; 381/117, 119, 109, 107, 98, 61; 341/110, 341/143; 704/267; 345/716
See application file for complete search history.

(56) References Cited

U.S. PATENT DOCUMENTS 5,647,008 A * 7/1997 Farhangi et al. ............ 381/119
5,852,800 A * 12/1998 Modeste et al. ......... 704/270.1
6,154,161 A * 11/2000 Leme et al. ................ 341/143

(Continued)

FOREIGN PATENT DOCUMENTS

JP 08077757 3/1996
JP 8-138354 A 5/1996
JP 09-146578 6/1997
JP 09-198057 7/1997
JP 09-245468 9/1997

(Continued)

OTHER PUBLICATIONS

Cakewalk Pro Audio 9 User's Guide; 1999. Twelve Tone Systems, Inc.*

(Continued)

*Primary Examiner*—Marlon T. Fletcher
*Assistant Examiner*—David S. Warren
(74) *Attorney, Agent, or Firm*—Morrison & Foerster LLP

(57) ABSTRACT

There is provided a portable mixing recorder which enables a user to readily produce music using overdubbing and/or other recording techniques while suppressing degradation of sound quality to the minimum without excessive concern for space restriction. An input analog audio signal is converted to a digital audio signal by an A/D converter section. A decoder reads out a compressed audio signal from an original source file stored in a memory card, and then extends the compressed audio signal to a digital audio signal. A mixing section mixes the digital audio signal obtained by the A/D conversion by the A/D converter section and the digital audio signal obtained by the extension by the decoder. An encoder compresses the digital audio signal obtained by the mixing by the mixing section to a compressed audio signal (mixed file). The mixed file obtained by the compression by the encoder is stored as a new source file in the memory card.

25 Claims, 13 Drawing Sheets

U.S. PATENT DOCUMENTS

U.S. PATENT DOCUMENTS

| | | | | |
|---|---|---|---|---|
| 6,218,971 | B1 * | 4/2001 | Sugihara | 341/110 |
| 6,311,161 | B1 * | 10/2001 | Anderson et al. | 704/500 |
| 6,359,632 | B1 * | 3/2002 | Eastty et al. | 345/716 |
| 6,438,434 | B1 * | 8/2002 | Kamiya | 700/94 |
| 6,466,672 | B1 * | 10/2002 | Steers | 381/61 |
| 6,580,647 | B1 | 6/2003 | Yokota et al. | |
| 6,832,293 | B1 * | 12/2004 | Tagawa et al. | 711/115 |
| 2002/0057809 | A1 * | 5/2002 | Heyl | 381/119 |

FOREIGN PATENT DOCUMENTS

| | | |
|---|---|---|
| JP | 10-049150 | 2/1998 |
| JP | 10-143172 | 5/1998 |
| JP | 2000-010572 | 1/2000 |
| JP | 2000-195164 | 7/2000 |
| JP | 2000338984 | 12/2000 |
| JP | 2001-142495 A | 5/2001 |

OTHER PUBLICATIONS

Omni I/O Manual; 2000. M-Audio. www.midiman.net.*

M-Audio Announces The Omni I/O, A New Desktop Recording Solution. Press Release. www.prorec.com/prorec/pressrel.nsf [select "By Date" and scroll to Sep. 15, 2000].*

Cakewalk Pro Audio 9 User's Guide; 1999. Twelve Tone Systems, Inc. (See new p. 2-26).*

Cakewalk Pro Audio 9: User's Guide (1999). p. 2-26 as indicated in a previous Office Action.*

* cited by examiner

SIMPLE RECORDING START TIME

SIMPLE RECORDING STOP TIME

RECORDING WITH MIXING START TIME

RECORDING WITH MIXING STOP TIME

PORTABLE MIXING RECORDER AND METHOD AND PROGRAM FOR CONTROLLING THE SAME

BACKGROUND OF THE INVENTION

1. Field of the Invention

This invention relates to a portable mixing recorder which enables a user to produce music by inputting an audio signal via a microphone or the like while monitoring a recorded audio signal, and mixing the input audio signal and the recorded audio signal, as well as to a method and a program for controlling the portable mixing recorder.

2. Description of the Related Art

In recent years, musical apparatuses with enhanced portability have been realized due to the advance of the audio compression technique and the miniaturization technique of electronic components. For example, a portable MP3 player employs the audio compression technique of MP3 (MPEG-1 Audio Layer-III), and reproduces audio signals encoded in the MP3 format. In the MP3 player, a WAV file obtained by digitally sampling an audio signal from the performance of a musical piece and/or the singing of a song is encoded in the MP3 format, and the resulting file compressed in the MP3 format is stored in a flash memory or the like. This enables the user to enjoy the reproduction of the recorded musical piece and/or song, away from home, e.g. outdoors, by using the portable MP3 player. Further, a portable karaoke apparatus is disclosed e.g. in Japanese Laid-Open Patent Publication (Kokai) No. 2000-338984 is capable of extending and reproducing an audio signal file encoded and stored in the MP3 format, and at the same time mixing an audio signal of a human voice input via a microphone with the reproduced audio signal, for audio reproduction, thereby enabling users to enjoy a desired karaoke performance away from home.

These apparatuses are all intended for reproduction or playback, and do not record or store audio signals input via a microphone or the like. However, there have been also proposed other types which are capable of recording and storing audio signals. For example, there has been proposed a portable MP3 recorder which is equipped with an analog input terminal, and is capable of performing A/D conversion of an audio signal input via the analog input terminal from a cassette tape recorder, a radio, or the like, and then encoding the resulting digital audio signal in the MP3 format, to store the compressed file as an audio signal file.

However, the portable MP3 recorder is not capable of performing “recording with mixing (overdubbing)” in which a number of input signals are multiplexed. As a musical apparatus capable of mixing, a double radio-cassette player, for example, is known. In the double radio-cassette player, it is possible to reproduce musical tones from one cassette tape, and at the same time mix an audio signal of the reproduced musical tones and an audio signal input via a microphone or an external input terminal, to record the mixed audio signals in the other cassette tape in a multiplexing manner.

In general, when music production e.g. by overdubbing is to be performed away from home, it is necessary for a musical apparatus to have capabilities of recording and mixing sound signals while maintaining the quality of the resulting mixed sound signal. However, the portable MP3 player and the karaoke apparatus are dedicatedly designed for reproduction, and not capable of recording input audio signals, while the portable MP3 recorder is not capable of mixing. Therefore, none of them is suitable for music production. Further, in the double radio-cassette player, when the mixing is repeatedly carried out, dubbing of analog signals of musical tones is repeatedly carried out, resulting in seriously degraded sound quality of the resulting audio signal file. Therefore, this apparatus is not suitable for music production, either.

On the other hand, a 4-channel MD multi-channel recorder using an MD (Minidisk) has been proposed (in Japanese Laid-Open Patent Publication (Kokai) No. 8-77757) as an apparatus designed mainly for music production. This multi-channel recorder is capable of recording a line-input signal on an MD after A/D conversion and audio compression. For example, the recorder is capable of overdubbing musical tones of several parts, mixing the musical tones, and then temporarily moving the mixed sound to a free channel (ping-pong recording). If a large number of parts are to be processed, musical tones of still another part can be further recorded in a channel made free by the ping-pong recording. Finally, all the parts can be mixed down in all the four channels.

However, in the above multi-channel recorder, during ping-pong recording, a digital audio signal recorded on the MD is converted to an analog audio signal and then mixed with a line-input signal (analog audio signal), and hence when the ping-pong recording is repeatedly carried out, the sound quality is inevitably degraded. Further, the multi-channel recorder is a stationary type which is not suitable for use in music production away from home.

Moreover, in the above multi-channel recorder, whether a line-input audio signal may be recorded in a single channel of an MD or whether audio signals recorded in a plurality of channels of the MD may be mixed and recorded in another channel by ping-pong recording, a recording instruction is given using a single recording key.

However, when the single recording key is used for issuing both an instruction for normal recording (i.e. recording of a line-input audio signal in a single channel) and the instruction for ping-pong recording, a user cannot visually distinguish the two instructions from each other and the user hesitates in determination as to what operation to do next.

Further, as shown in FIG. 13, when the above-described multi-channel recorder is used for carrying out overdubbing (recording with mixing) of a line-input audio signal (performance signal) on part of an audio signal (source file) recorded in a channel, it is necessary to start the operation of the recording with mixing simultaneously with the start of reproduction of the source file, stand by while monitoring reproduction of the source file until the recording proceeds to a desired position for starting the overdubbing, and then start performance for the overdubbing, at the time point the recording has come to the position.

However, when a performance signal to be overdubbed is captured via line input by collecting, via a microphone, performance tones generated by a user playing a musical instrument, the microphone can pick up undesired tones or noise other than the performance tones, so that the user has to be very careful so as not to make noise while waiting to play the instrument, which causes the user to lose concentration on the performance.

SUMMARY OF THE INVENTION

It is an object of the present invention to provide a portable mixing recorder which enables a user to readily produce music using overdubbing and/or other recording techniques while suppressing degradation of sound quality to the minimum without excessive concern for space restriction, as well as a method and a program for controlling the portable mixing recorder.

To attain the above object, in a first aspect of the invention, there is provided a portable mixing recorder comprising an input and conversion device that receives an analog audio signal and converts the analog audio signal to a first digital audio signal;

a decoding device that reads out a compressed audio signal from an original source file stored in a predetermined memory and having the compressed audio signal recorded therein, and then extends the compressed audio signal into a second digital audio signal, a mixing device that mixes the first digital audio signal and the second digital audio signal into a third digital audio signal, a first encoding device that compresses the third digital audio signal into a compressed audio signal, and a storage control device that causes the compressed audio signal obtained by the first encoding device to be stored in the predetermined memory, as a new source file.

According to this portable mixing recorder, an input analog audio signal is converted to the first digital audio signal, while an original source file having a compressed audio signal recorded therein and stored in the predetermined memory is read out and extended to the second audio signal. Then, the first digital audio signal and the second audio signal are mixed into the third digital audio signal, which is compressed to a compressed audio signal, and then stored as a new source file in the predetermined memory. Thus, the audio signal input as an analog signal and the original source file are converted to the digital audio signals and then mixed, and the mixed digital audio signal (third digital audio signal) thus obtained is stored as the new source file which can be utilized as an original source file on the next occasion of recording. Therefore, by repeatedly carrying out overdubbing, it is possible to complete a musical piece formed of a number of multiplexed audio signals. Further, since the mixing is performed using digitalized audio signals, even if the overdubbing is repeatedly carried out, the sound quality is only slightly degraded by compression and extension of the audio signals, and hence degradation of sound quality as a whole can be suppressed. In addition, since the mixed digital audio signal (third digital audio signal) is stored after being compressed to a compressed audio signal, the memory capacity of the recorder can be reduced, which contributes to improvement of the portability of the recorder. Thus, the present portable mixing recorder enables the user to readily produce music by using the overdubbing and other techniques while suppressing degradation of sound quality to the minimum without excessive concern for space restriction.

Preferably, the portable mixing recorder further comprises an undo buffer, and when causing the new source file to be stored in the predetermined memory, the storage control device causes the original source file to be temporarily stored in the undo buffer and causes the original source file to be deleted from the predetermined memory.

According to this referred embodiment, when a new source file is stored in the predetermined memory, the original source file is temporarily stored in the undo buffer. As a result, for example, when the recording with mixing is unsuccessful or the recorded sound is not satisfactory, it is possible to readily retry the recording with mixing by using the original source file temporarily stored in the undo buffer, which enhances the operability of the recorder.

Preferably, the portable mixing recorder further comprises a second encoding device that compresses the first digital audio signal into a compressed audio signal, and when causing the new source file to be stored in the predetermined memory, the storage control device causes the compressed audio signal obtained by the second encoding device to be stored in the predetermined memory, as a separate file different from the new source file.

According to this preferred embodiment, when a new source file is stored in the predetermined memory, a compressed audio signal obtained by compressing the first digital audio signal is recorded in a separate file different from the new file. As a result, for example, when the final result of mixing performed by repetition of overdubbing is not pleasing, the separate file having the first digital audio signal recorded therein can be processed afterward by using a personal computer or the like. Thus, it is possible to make use of the separate file afterward, which improves the operability of the recorder in music production.

Preferably, the portable mixing recorder further comprises a display device that displays predetermined information indicating that the new source file is stored in the predetermined memory when the storage control device causes the new source file to be stored in the predetermined memory.

According to this preferred embodiment, it is possible to easily confirm that the recording with mixing has been started or being performed, which enhances the operability of the recorder.

Preferably, the portable mixing recorder further comprises a connection device that connects at least one other portable mixing recorder as a slave recorder to the portable mixing recorder in cascade, and a slave input device that receives from the slave recorder connected in cascade by the connection device a slave-side input digital audio signal obtained by converting an analog audio signal input to the slave recorder to a digital audio signal, and the mixing device mixes the first digital audio signal, the second digital audio signal, and the slave-side input digital audio signal received by the slave input device.

According to this preferred embodiment, the portable mixing recorder and at least one other portable mixing recorder as a slave recorder are connected in cascade, and a slave-side input digital audio signal converted from an analog audio signal input to the slave recorder is received from the slave recorder. The first digital audio signal, the second digital audio signal, and the slave-side input digital audio signal are mixed together. In short, by connecting the portable mixing recorder to another portable mixing recorder as a slave recorder in cascade, it is possible to mix not only the first digital audio signal and the second digital audio signal, but also the slave-side input digital audio signal received from the slave recorder. Therefore, it is possible to increase the number of input signals which can be mixed down at a time, by the number of slave recorders, thereby enhancing the efficiency in music production.

To attain the above object, in a second aspect of the invention, there is provided a portable mixing recorder comprising a memory that stores files having recorded therein respective compressed digital audio signals, including a source file having a compressed digital audio signal recorded therein, an input and conversion device that receives an analog audio signal and converts the analog audio signal to a first digital audio signal, a first level adjustment device that adjusts a level of the first digital audio signal, a decoding device that reads out the compressed audio signal from the source file, and extends the compressed audio signal into a second digital audio signal, a second level adjustment device that adjusts a level of the second digital audio signal, a mixing device that mixes the first digital audio signal subjected to the level adjustment by the first level adjustment device and the second digital audio signal subjected to the level adjustment by the second level adjustment device into a third digital audio signal, an encoding device that compresses the third digital audio signal into a compressed audio signal, and a storage control device that causes the compressed audio signal obtained by the encoding device to be stored in the memory.

According to this portable mixing recorder, although the recorder is configured to be a portable type which mixes only the first digital audio signal converted from one input analog (stereo) audio signal and the second digital audio signal obtained by extending one compressed digital (stereo) audio signal recorded in a source file, it is possible, e.g. by repeating overdubbing, to mix a desired number of input sources to produce music. Further, the first level adjustment device for adjusting the level of the first digital audio signal converted from one input analog (stereo) audio signal and the second level adjustment device for adjusting the level of the second digital audio signal obtained by extending one compressed digital (stereo) audio signal recorded in a source file are provided separately such that that each device can perform level adjustment independently. Therefore, it is possible to adjust the level of each input source separately with minimal construction, which enables recording with mixing to be performed with an enhanced degree of freedom. Further, since digital signals are compressed and extended, it is possible to save the storage capacity of the memory while suppressing degradation of sound quality.

Preferably, when causing the compressed audio signal to be stored in the memory, the storage control device causes the compressed audio signal to be substantially overwritten to the source file.

According to this preferred embodiment, whenever overdubbing is performed, the compressed audio signal to be substantially overwritten to the original source file, and therefore, a user need not take the trouble of deleting the original source file. In addition, since source files are not increased in number, the storage capacity of the memory can be saved.

Preferably, the portable mixing recorder comprises an undo buffer, and when causing the compressed audio signal to be stored in the memory, the storage control device causes the source file to be temporarily stored in the undo buffer and causes the source file to be deleted from the memory.

According to this preferred embodiment, when causing the compressed audio signal to be stored in the memory, the storage control device causes the source file to be temporarily stored in the undo buffer and causes the source file to be deleted from the memory. Therefore, for example, when the recording with mixing is unsuccessful or the recorded sound is not satisfactory, it is possible to readily retry the recording with mixing by using the source file temporarily stored in the undo buffer, which enhances the operability of the recorder.

To attain the above object, in a third aspect of the invention, there is provided a portable mixing recorder comprising a memory that stores files having recorded therein respective compressed digital audio signals, including a source file having a compressed digital audio signal recorded therein, an input and conversion device that receives an analog audio signal and converts the analog audio signal to a first digital audio signal, a first effect applying device that applies a first kind of effect to the first digital audio signal, a decoding device that reads out the compressed audio signal from the source file, and extends the compressed audio signal into a second digital audio signal, a mixing device that mixes the first digital audio signal having the first kind of effect applied thereto by the first effect applying device and the second digital audio signal into a third digital audio signal, a second effect applying device that applies a second kind of effect different from the first kind of effect to the third digital audio signal, and an output device that outputs the third digital audio signal having the second kind of effect applied thereto by the second effect applying device, from the recorder.

According to this portable mixing recorder, an effect of a type which is not spoiled by repetition of overdubbing or the like is applied or added by the first effect applying device, and an effect, such as reverberation, of a type which is spoiled by repetition of overdubbing or the like is applied by the second effect applying device. In other words, an effect of the former type is overdubbed a plurality of times, whereas an effect of the latter type is added to an audio signal only once immediately before the audio signal is output. Therefore, the portable mixing recorder of the present aspect is capable of maintaining excellent sound quality with the minimal construction.

To attain the above object, in a fourth aspect of the invention, there is provided a portable mixing recorder comprising an input and conversion device that receives an analog audio signal and converts the analog audio signal to a first digital audio signal, a reproduction device that reproduces a second digital audio signal from a source file stored in a predetermined memory, a recording instruction device that is operatable to instruct recording of the first digital audio signal in the predetermined memory, a recording-with-mixing instruction device that is operatable to instruct mixing of the first digital audio signal and the second digital audio signal into a third digital audio signal, and recording of the third digital audio signal in the predetermined memory, and a control device that causes the first digital audio signal to be stored in the memory when the recording instruction device is operated by a user, and causes the first digital audio signal and the second digital audio signal to be mixed into a third digital audio signal, and the third digital audio signal to be stored in the memory when the recording-with-mixing instruction device is operated by the user.

According to this portable mixing recorder, when the recording instruction device is operated by the user, the first digital audio signal formed by the input and conversion device that receives an analog audio signal and converts the analog audio signal to the first digital audio signal is stored in the memory, while when the recording-with-mixing instruction device is operated by the user, the first digital audio signal and the second digital audio signal reproduced from a source file stored in the memory by the reproduction device are mixed and stored in the memory. Thus, the recording instruction device that is operated for instructing recording of the first digital audio signal in the memory, and the recording-with-mixing instruction device that is operated for instructing mixing of the first digital audio signal and the second digital audio signal into the third digital audio signal and instructing storing of the third digital audio signal in the memory are provided as separate devices. Therefore, the user can select a desired one of the recording and the recording with mixing simply by operating the corresponding recording device, with ease. This prevents the user from hesitating in operation for instructing recording, thereby enhancing the operability of the recorder.

Preferably, the source file has a compressed digital audio signal recorded therein, and the reproduction device reproduces the second digital audio signal by reading out the compressed digital audio signal from the source file and extending the compressed digital audio signal, and when the first digital audio signal is to be stored in the memory, the control device causes the first digital audio signal to be compressed and then stored in the memory, while when the third digital audio signal is to be stored in the memory, the control device causes the third digital audio signal to be compressed and then stored in the memory.

According to this preferred embodiment, since the mixed digital audio signal is stored after having been compressed to a compressed digital audio signal, the capacity of the memory can be reduced, which contributes to improvement of portability of the recorder. Thus, the present embodiment makes it possible to produce music by using the overdubbing and other techniques while suppressing degradation of sound quality to the minimum with ease without excessive concern for space restriction.

To attain the above object, in a fifth aspect of the invention, there is provided a portable mixing recorder comprising an input and conversion device that receives an analog audio signal and converts the analog audio signal to a first digital audio signal, a reproduction device that reproduces a second digital audio signal from a source file stored in a predetermined memory, a recording-with-mixing instruction device that is operatable to instruct mixing of the first digital audio signal and the second digital audio signal into a third digital audio signal, and recording of the third digital audio signal in the predetermined memory; in the memory, a temporary stop instruction device that is operatable to instruct the reproduction device to temporarily stop reproduction of the second digital audio signal, and a control device that, when the recording-with-mixing instruction device is operated by a user after the reproduction of the second digital audio signal is temporarily stopped by the temporary stop instruction device, causes the first digital audio signal and the second digital audio signal to be mixed starting from a position where the reproduction was temporarily stopped, and then causes the third digital audio signal to be stored in the memory.

According to this portable mixing recorder, when the recording with mixing instruction device is operated by the user after reproduction of the second digital audio signal is interrupted, mixing of the first digital audio signal and the second digital audio signal reproduced by the reproduction device is started from the position where the reproduction was stopped, and the digital audio signal obtained by the mixing is stored in the memory. In other words, when the user wants to carry out recording with mixing only on a portion of the source file, the other portion of the source file on which the user does not want to carry out the recording with mixing is only reproduced, so that differently from a case where the conventional multi-channel recorder is used, the user is not held in a standby state for the recording with mixing, and no signal other than an audio signal for the recording with mixing can be picked. This enables the user to concentrate on the performance or other necessary operation for the recording with mixing.

Preferably, the source file has a compressed digital audio signal recorded therein, and the reproduction device reproduces the second digital audio signal by reading out the compressed digital audio signal from the source file and extending the compressed digital audio signal, and wherein the control device causes the third digital audio signal to be compressed and then stored in the memory.

According to this preferred embodiment, since the mixed digital audio signal is stored after having been compressed to a compressed digital audio signal, the capacity of the memory can be reduced, which contributes to improvement of the portability of the recorder. Thus, the present embodiment makes it possible to produce music by using the overdubbing and other techniques while suppressing degradation of sound quality to the minimum with ease without excessive concern for space restriction.

To attain the above object, in a sixth aspect of the present invention, there is provided a control method of controlling a portable mixing recorder, comprising the steps of converting an input analog audio signal to a first digital audio signal, reading out a compressed audio signal from an original source file stored in a predetermined memory and having the compressed audio signal recorded therein, and then extending the compressed audio signal into a second digital audio signal, mixing the first digital audio signal and the second digital audio signal into a third digital audio signal, compressing the third digital audio signal into a compressed audio signal, and causing the compressed audio signal obtained by the step of compressing the third digital audio signal to be stored in the predetermined memory, as a new source file.

According to this control method, the same effects as those obtained by the portable mixing recorder according to the first aspect can be obtained.

To attain the above object, in a seventh aspect of the present invention, there is provided a control method of controlling a portable mixing recorder, comprising the steps of converting an input analog audio signal to a first digital audio signal, adjusting a level of the first digital audio signal, reading out the compressed digital audio signal from a memory storing files having recorded therein respective compressed digital audio signals, including a source file having a compressed digital audio signal recorded therein, and then extending the compressed digital audio signal into a second digital audio signal, adjusting a level of the second digital audio signal, mixing the first digital audio signal subjected to the level adjustment by the step of adjusting the level of the first digital audio signal and the second digital audio signal subjected to the level adjustment by the step of adjusting the level of the second digital audio signal into a third digital audio signal, compressing the third digital audio signal into a compressed audio signal, and causing the compressed audio signal obtained by the step of compressing the third digital audio signal to be stored in the predetermined memory.

According to this control method, the same effects as those obtained by the portable mixing recorder according to the second aspect can be obtained.

To attain the above object, in an eighth aspect of the present invention, there is provided a control method of controlling a portable mixing recorder, comprising the steps of converting an input analog audio signal to a first digital audio signal, applying a first kind of effect to the first digital audio signal, reading out the compressed digital audio signal from a memory storing files having recorded therein respective compressed digital audio signals, including a source file having a compressed digital audio signal recorded therein, and then extending the compressed digital audio signal into a second digital audio signal, mixing the first digital audio signal having the first kind of effect applied thereto by the step of imparting the first kind of effect and the second digital audio signal into a third digital audio signal, applying a second kind of effect different from the first kind of effect to the third digital audio signal, and outputting the third digital audio signal having the second kind of effect applied thereto by the step of imparting the second kind of effect, from the recorder.

According to this control method, the same effects as those obtained by the portable mixing recorder according to the third aspect can be obtained.

To attain the above object, in a ninth aspect of the present invention, there is provided a control method of controlling a portable mixing recorder, comprising the steps of converting an input analog audio signal to a first digital audio signal, reproducing a second digital audio signal from a source file stored in a predetermined memory, and causing the first digital audio signal to be stored in the memory when a recording instruction device is operated by a user, causing the first digital audio signal and the second digital audio signal to be mixed into a third digital audio signal when a recording-with-mixing instruction device is operated by the user, and then causing the third digital audio signal to be stored in the predetermined memory.

According to this control method, the same effects as those obtained by the portable mixing recorder according to the fourth aspect can be obtained.

To attain the above object, in a tenth aspect of the present invention, there is provided a control method of controlling a portable mixing recorder, comprising the steps of converting an input analog audio signal to a first digital audio signal, reproducing a second digital audio signal from a source file stored in a predetermined memory, and causing the first digital audio signal and the second digital audio signal file to be mixed into a third digital audio signal when a recording-with-mixing instruction device is operated by a user after reproduction of the second digital audio signal is temporarily stopped by a temporary stop instruction device, starting from a position where the reproduction was temporarily stopped, and then causing the third digital audio signal to be stored in the predetermined memory.

According to this control method, the same effects as those obtained by the portable mixing recorder according to the fifth aspect can be obtained.

Further, to attain the above object, there are provided programs for causing a computer to execute the control methods according to the sixth to tenth aspects, respectively, to obtain the same effects as obtained by the portable mixing recorder according to the fifth to tenth aspects.

The above and other objects, features, and advantages of the invention will become more apparent from the following detailed description taken in conjunction with the accompanying drawings.

BRIEF DESCRIPTION OF THE DRAWINGS

FIGS. 1A to 1C are views schematically showing the appearance of a portable mixing recorder according to an embodiment of the present invention, in which:

FIG. 1A is a plan view of the portable mixing recorder;

FIG. 1B is a front view of the portable mixing recorder; and

FIG. 1C is a right side view of the portable mixing recorder;

FIGS. 4A and 4B are block diagrams schematically showing signal flows corresponding to respective operations, in a manner associated with related functional blocks in FIGS. 2A and 2B, in which:

FIG. 4A shows a signal flow in an operation for simple recording; and

FIG. 4B shows a signal flow in an operation for song reproduction;

FIGS. 5A and 5B are other block diagrams schematically showing signal flows corresponding to respective operations, in a manner associated with related functional blocks in FIGS. 2A and 2B, in which:

FIG. 5A shows a signal flow in an operation for recording with mixing; and

FIG. 5B shows a signal flow in another operation for recording with mixing;

FIGS. 6A to 6C are block diagrams schematically showing signal flows corresponding to respective operations, in a manner associated with related functional blocks in FIGS. 2A and 2B, in which:

FIG. 6A shows a signal flow in an operation using a metronome function;

FIG. 6B shows a signal flow in an operation using a tuner function; and

FIG. 6C shows a signal flow in an operation using a tone generator function;

FIGS. 7A to 7D are views showing examples of screen views displayed on a display appearing in FIG. 1B, in which:

FIG. 7A shows an example of a screen view displayed at the start of simple recording;

FIG. 7B shows an example of a screen view displayed during stoppage of simple recording;

FIG. 7C shows an example of a screen view displayed at the start of recording with mixing;

FIG. 7D shows an example of a screen view displayed during stoppage of recording with mixing;

DETAILED DESCRIPTION OF THE PREFERRED EMBODIMENTS

The present invention will now be described in detail with reference to the drawings showing an embodiment thereof.

Figures 1A, 1B, 1C:
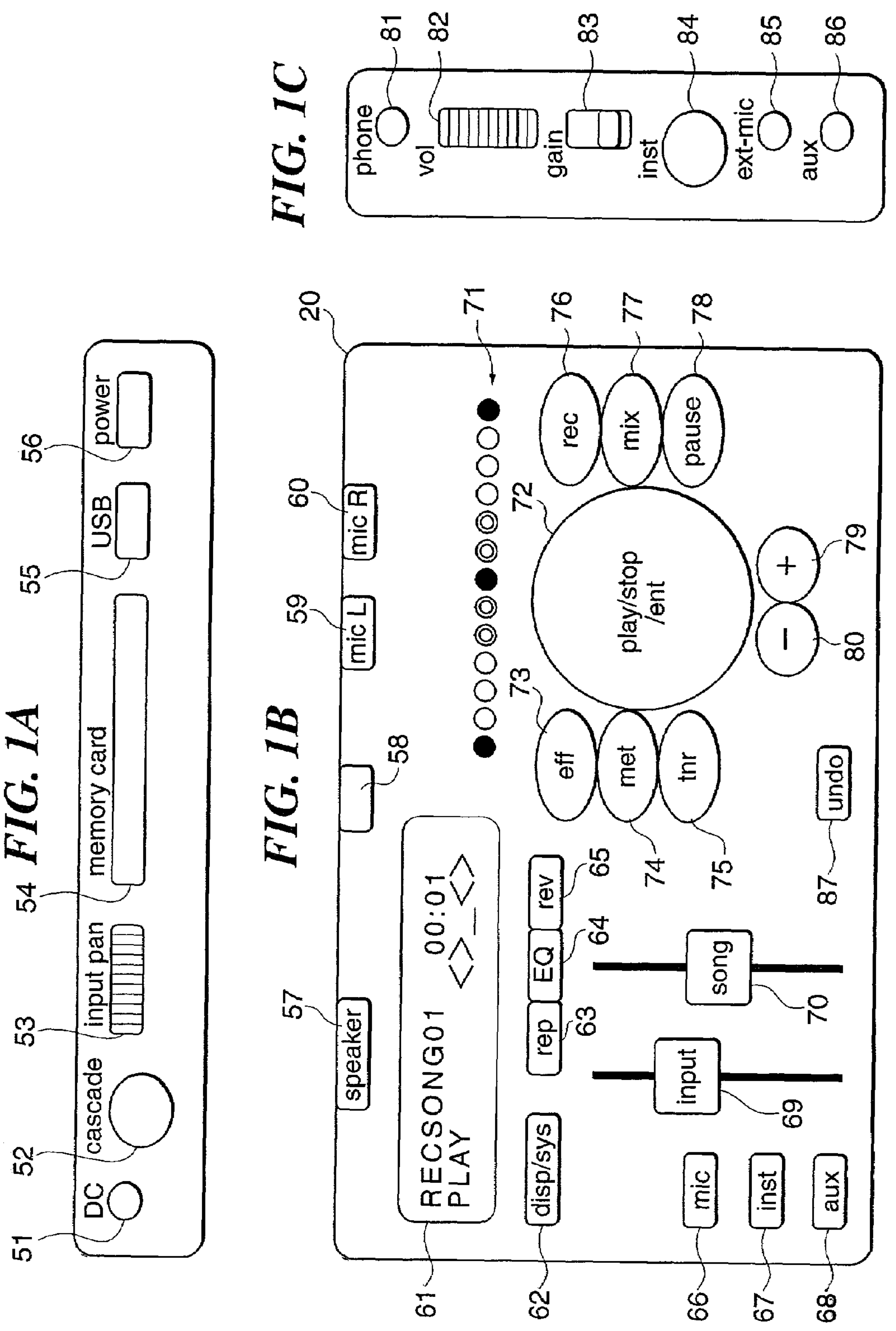

Referring first to FIGS. 1A to 1C, there is schematically shown the appearance of a portable mixing recorder according to an embodiment of the present invention. FIG. 1A shows the portable mixing recorder in plan view. FIG. 1B shows the same in front view. Further, FIG. 1C shows the same in right side view. The present portable mixing recorder 20 is a musical apparatus intended for producing music by receiving an audio signal input via a microphone or the like while monitoring reproduction of a recorded audio signal, and carrying out digital mixing of these audio signals. The recorder 20 is particularly configured to be a portable musical apparatus easy to handle even away from home.

As shown in FIG. 1A, DC power is supplied via a terminal (DC) 51. A cascade terminal (cascade) 52 (part of a connection device; part of a slave input device) is used for connecting two portable mixing recorders in cascade, as described hereinafter. A localizer (input pan) 53 is used for localizing input sound. A memory card 10 (predetermined memory), described hereinafter, is inserted into a slot 54. A USB (Universal Serial Bus) terminal 55 is for USB connection with a personal computer, not shown. When a power switch (power) 56 is depressed or released, the power of the recorder 20 is turned on or off.

As shown in FIG. 1B, the present recorder 20 incorporates a small-sized internal speaker (speaker) 57 for auxiliarily outputting an audio signal or generating various operation sounds. A master designation switch 58 designates one of the two recorders connected in cascade, as a master (the other as a slave). One of the recorders having the master designation switch 58 thereof depressed most recently is designated as a master, and the other as a slave. Internal microphones (mic L, mic R) 59, 60 (parts of an input and conversion device) are used for inputting, external audio sounds including a human voice, in stereo, as analog signals.

A display 61 is formed by a liquid crystal display. On the display 61 are displayed various information items, such as the name of a musical piece, the time of day, a playing time, a mode, configuration (settings) information, etc. A disp/sys switch 62 is used for switching the display mode of the display 61, and switching between system configuration screen views for copying or deleting a musical piece, changing the name of a musical piece, and so forth. A rep switch 63 is used for executing repetitive reproduction of musical tones. An EQ switch 64 and a rev switch 65 are used for selection of an output ambient condition, e.g. for equalization of an output voice and impartment of reverberation to the same.

A mic switch 66, an inst switch 67, and an aux switch 68 are each used for selection of an input audio signal path, i.e. for input selection. A selected one of the switches lights up. On the other hand, as shown in FIG. 1C, the recorder 20 has a side face thereof provided with an inst terminal 84, an external microphone (ext-mic) terminal 85 for connection with an external microphone of an accessory (or necktie) pin type, and an aux terminal 86 (all of which are parts of the input and conversion device). When the mic switch 66 is selected, normally, signals from the internal microphones 59, 60 can be input, but when an external microphone is connected to the external microphone (ext-mic) terminal 85, a signal from the external microphone is input in preference to the signals from the internal microphones 59, 60. When the internal microphones 59, 60 are selected, the internal speaker 57 is automatically turned off. When the inst switch 67 is selected, it is possible to input a signal from an electronic musical instrument, such as an electric guitar or an electric keyboard, connected to the inst terminal 84. Further, when the aux switch 68 is selected, it is possible to input a signal from an audio apparatus or the like connected to the aux terminal 86 by line-input.

An input level (input) adjuster 69 is used for adjusting the input level of an audio signal externally input, while an output level (song) adjuster 70 is used for adjusting the reproduction level of an audio signal reproduced from a source file 11 stored in a memory card 10, described in detail hereinafter.

An LED level meter 71 is comprised of a plurality of LED's, each of which lights up or blinks to indicate an input level, a reproduction level, a recording level, and so forth. A reproduction/recording (play/stop/ent) button 72 is not only used for starting and stopping reproduction and recording, but also used as a determination key for determining various configurations. An eff button 73 is used for applying effects, such as delay, to input audio signals. A met button 74 is used for setting and turning on/off of a metronome function. A tnr button 75 is used for utilizing a tuner function and a tone generator function. In an input mode, the LED level meter 71 blinks according to the pitch of an input audio signal, whereas in a tone mode, a reference tone of a preset musical interval is sounded.

A rec button 76 is used for digital recording of an input audio signal. When the rec button 76 is depressed, the recorder 20 is placed in a recording standby state, and then when the reproduction/recording button 72 is depressed, the recording is started. A mix button 77 is used for carrying out digital recording with mixing of an input audio signal and an audio signal reproduced from the source file 11. When the mix button 77 is depressed, the recorder 20 is placed in a recording-with-mixing standby state, and then when the reproduction/recording button 72 is depressed, the recording with mixing is started. A pause button 78 is used for temporarily stopping the reproduction. It should be noted that each of the buttons 73 to 76 incorporates an LED, not shown, which lights up when the button is depressed.

A plus (+) button 79 and a minus (−) button 80 are used for selection of a musical piece (hereinafter referred to as "a song") in the source file 11. The name of a song selected by the plus or minus button 79(80) is shown on the display 61. When the name of a desired song is displayed, the reproduction/recording button 72 is depressed, whereby the selection of the song is determined. It should be noted that when the user has not named a song, a name (serial number or the like) is automatically added to the song when the song is recorded in the source file 11. An undo button 87 is used for canceling an immediately preceding memory access process and restoring an original state.

Referring to FIG. 1C, a phone terminal 81 is connectable to a head phone or the like, via which input sound, a song, or a mixed audio sound which is being reproduced can be listened to. A volume (vol) controller 82 is used for setting an audio output level. A gain controller 83 is used for gain adjustment of an audio signal input via the inst terminal 84.

Figure 2A:
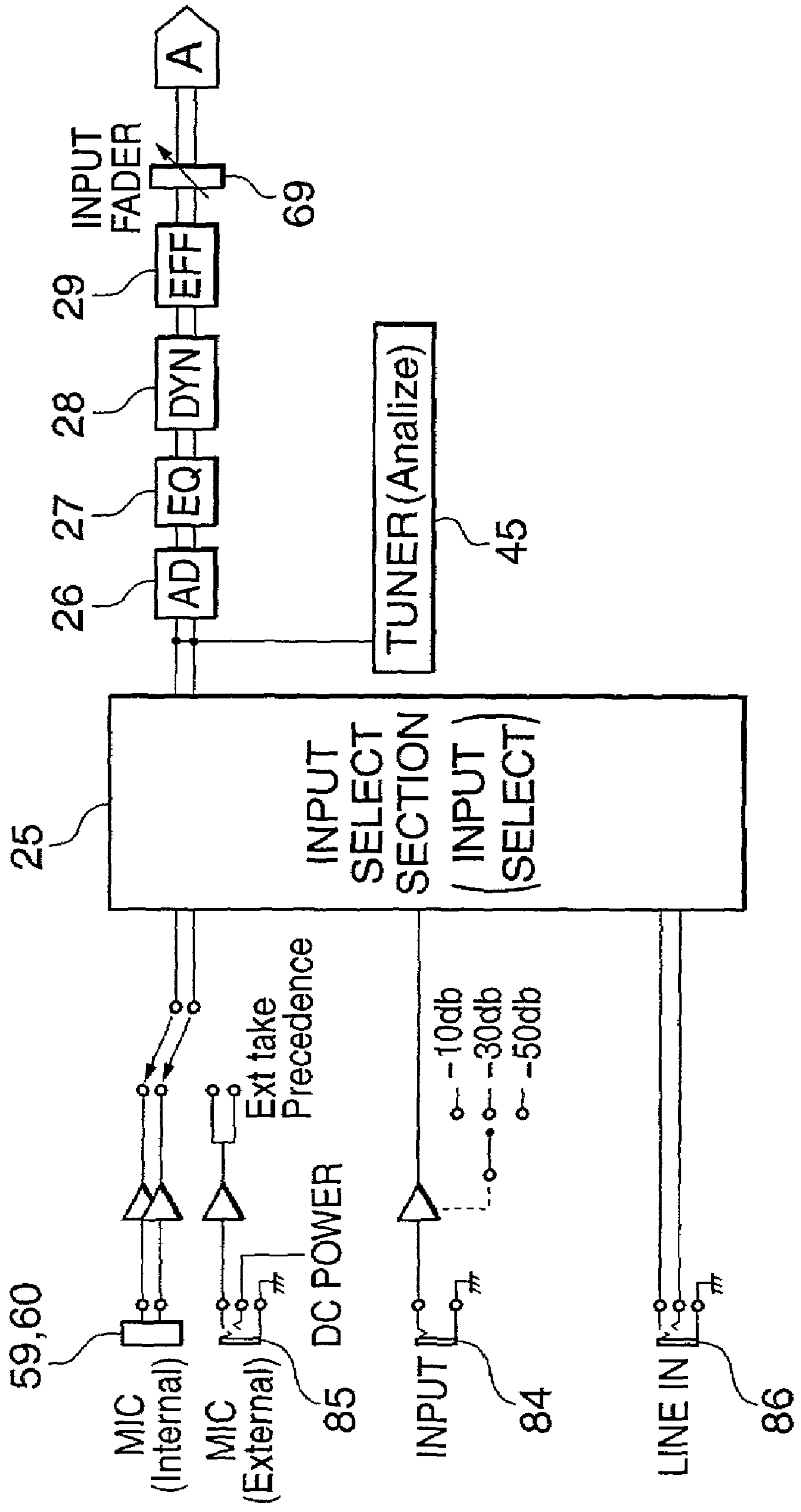
FIGS. 2A and 2B is a functional block diagram schematically showing functional blocks of the portable mixing recorder.
Figure 2B:
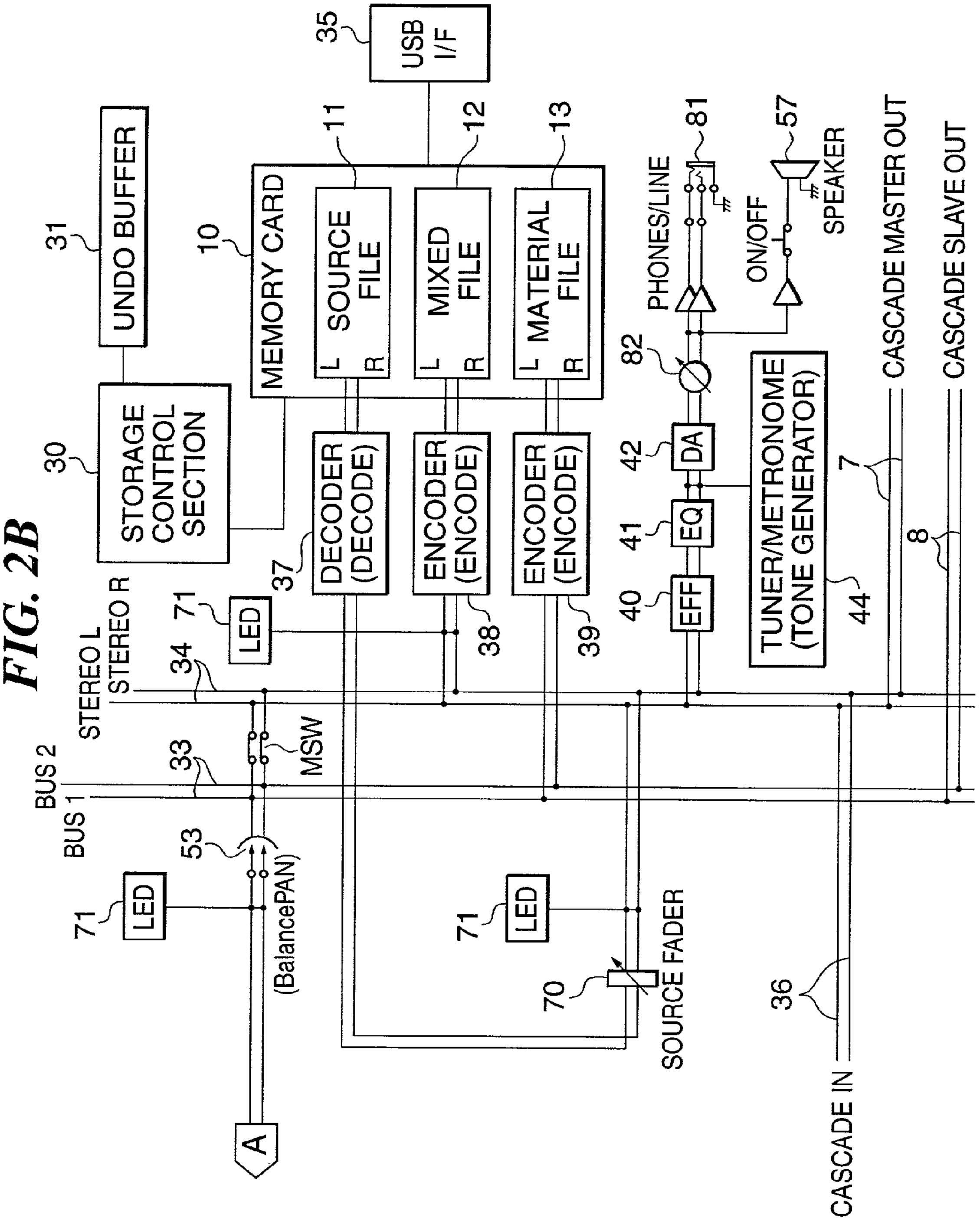

FIGS. 2A and 2B shows the functional blocks of the present mixing recorder. The memory card 10 is a portable and removable storage medium. The illustrated example shows a state in which the memory card 10 is inserted.

An input select section 25 (part of the input and conversion device) selects an analog audio signal to be input or received, from signals from the pair of internal microphones 59, 60, the inst terminal 84, the external microphone terminal 85 and the aux terminal 86. The analog audio signal delivered from the input select section 25 is converted to a digital audio signal by an A/D converter section 26 (part of the input and conversion device). Then, the digital audio signal is equalized by an EQ (equalizer) 27, subjected to a consonant suppressing process by a DYN (dynamic effector) 28, and has applied thereto effects, such as reverberation, delay, and flanger, by an EFF (effector) 29.

The signal output from the EFF 29 is subjected to input level adjustment by the input level adjuster 69 and localization by the localizer 53, and then input to an input line (BUSES 1, 2) 33 and a switch section MSW. When two recorders 20 are connected in cascade, one of them is designated as a master by the master designation switch 58, as described hereinbefore, and if the present recorder 20 is designated as the master, the switch section MSW is turned on, whereas if the present recorder 20 is designated as the slave, the switch section MSW is turned off.

The signal input to the input line 33 is input to an encoder (ENCODE) 39 (second encoding device). If the present recorder 20 is the slave, the signal input to the input line 33 is further output via an output line 8 to the master connected to the present recorder 20 in cascade.

The present recorder 20 includes a storage control section 30 (storage control device) and an undo buffer 31. The undo buffer 31 is implemented by a RAM or the like. The undo buffer 31 and the memory card 10 are both connected to the storage control section 30, which controls storage operations of the undo buffer 31 and the memory card 10. The memory card 10 is provided with a USB I/F (interface) 35.

Figure 3:
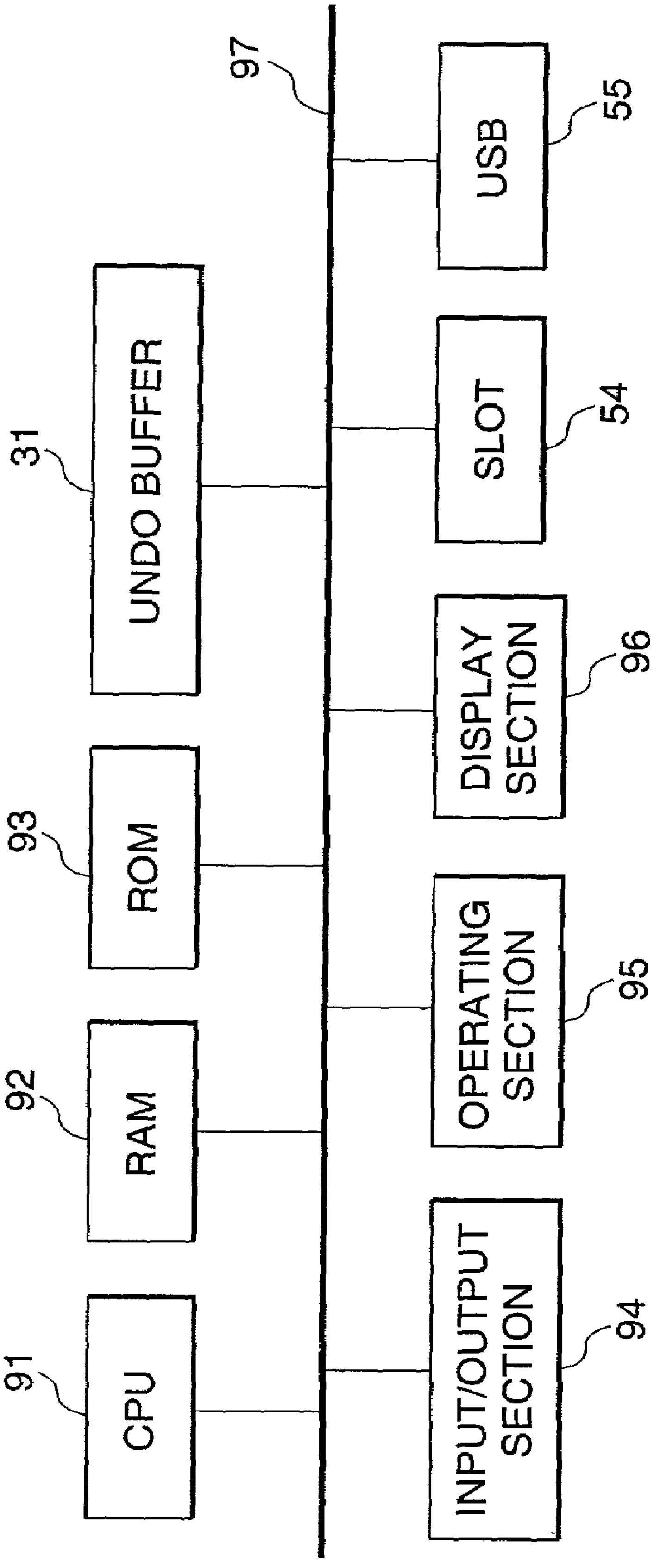
FIG. 3 is a block diagram showing the internal construction of the portable mixing recorder.

FIG. 3 shows the internal construction of the present portable mixing recorder.

In the recorder 20, the undo buffer 31, the slot 54 and the USB terminal 55 are connected to a CPU 91 via a bus 97. Further, a RAM 92, a ROM 93, an input/output section 94, an operating section 95 and a display section 96 are also connected to the CPU 91 via the bus 97.

The CPU 91 controls the overall operation of the recorder 20. The RAM 92 temporarily stores various kinds of data, and also functions as a work area for the CPU 91. The ROM 93 stores not only various control programs to be executed by the CPU 91, but also various kinds of data.

The input/output section 94 is comprised of a group of elements involved in the input to and output from the present recorder 20, including the cascade terminal 52, the internal microphones 59, 60, the terminals 84 to 86, the internal speaker 57, and the phone terminal 81. The operating section 95 is comprised of a group of elements involved in the input to and operation of the present recorder 20, including the master designation switch 58, the switches 62 to 68, the adjusters 69, 70 and the buttons 72 to 80. The display section 96 is comprised of a group of elements involved in display, including the display 61 and the LED level meter 71.

Referring again to FIGS. 2A and 2B, the memory card 10 can store the source file 11, a mixed file 12 and a material file 13. These files each store data of an audio signal compressed in the MP3 (MPEG-1 Audio Layer-III) format.

The source file 11 is an original file to be mixed with an audio signal input e.g. from the internal microphones 59, 60 via the input select section 25. The source file 11 is initially stored as a mixed file 12 by recording an input audio signal without executing a mixing process (this kind of recording will be hereinafter referred to as "simple recording")(in this case, since no mixing process is carried out, the name of the mixed file does not represent the contents of the file faithfully). It should be noted that there can be a plurality of source files 11. Further, the source file 11 may be obtained by mounting a memory card 11 into another apparatus and storing existing data therein in advance.

The mixed file 12 records a mixed signal formed by mixing an audio signal reproduced from the source file 11 and an audio signal input via the input select section 25 (this kind of recording is referred to as "recording with mixing" throughout the specification). The mixed file 12 can be used as a new source file 11 in place of an original source file 11 on a subsequent occasion.

The material file 13 is formed by recording an audio signal input via the input select section 25 without mixing the same with an audio signal reproduced from the source file 11. The material file 13 is stored as a file (separate file) separate from the mixed file 12. It should be noted that whether or not the material file 13 is to be generated during recording with mixing can be set according to the user's intention.

In recording with mixing, an audio signal from the source file 11 is extended to a digital audio signal by a decoder (DECODE) 37 (decoding device). The digital audio signal is subjected to output level adjustment by the output level adjuster 70, and then input to an output line 34 (mixing device).

When the present recorder 20 is designated as a master, a signal input to the switch section MSW after localization by the localizer 53 is also input to the output line 34. On the other hand, from a slave recorder connected to the master recorder 20 in cascade, a digital audio signal (slave-side input digital audio signal) is input to the output line 34 via a line 36 (part of a slave input device). When a signal is input to the output line 34 from any of the switch section MSW, the slave recorder, and the decoder 37, the signal is delivered to each of an encoder (ENCODE) 38 (first encoding device) and an EFF 40, and at the same time delivered to the slave recorder via an output line 7.

The digital audio signal input to the encoder 38 via the output line 34 is compressed in the MP3 format by the encoder 38, and then stored as a mixed file 12 in the memory card 10. On the other hand, the digital audio signal input to the encoder 39 via the output line 33 is compressed in the MP3 format by the encoder 39, and then stored as a material file 13 in the memory card 10.

When the mixed file 12 is stored by recording with mixing, the original source file 11 is deleted. Accordingly, the process of storing the mixed file 12 appears to be similar to a process of overwriting the source file 11 by a new source file 11. Actually, however, the original source file 11 is temporarily stored in the undo buffer 31, which makes it easy to retry the recording with mixing.

Although the undo buffer 31 is arranged in the body of the recorder 20 in the present embodiment, it may be arranged within the memory card 10. Further, it is preferable that the file stored in the undo buffer 31 is preserved at least until a mixed file 12 is stored on the next occasion.

The digital audio signal input to the EFF 40 from the output line 34 has effects applied thereto by the EFF 40, and is equalized by the EQ 41, and converted to an analog audio signal by the D/A converter section 42. Then, the analog audio signal is subjected to volume setting by the volume controller 82, followed by being output to the phone terminal 81, and also to the internal speaker 57 depending on the case.

As described above, the recorder 20 is capable of performing digital recording of an input audio signal and real-time reproduction of the same, digital recording with mixing of an input audio signal and an audio signal (of a song) reproduced from the source file 11 and real-time reproduction of the mixed sound, reproduction of the audio signal from the source file 11, and so forth.

The recorder 20 is further provided with a tuner 45 and a tuner/metronome 44. In the above-mentioned input mode, the tuner 45 detects the pitch of an analog audio signal output from the input select section 25, and causes the LED level meter 71 to indicate the detected pitch. In the above-mentioned tone mode, the reference tone of the preset musical interval is output from the tuner/metronome 44 to the D/A converter section 42. When the metronome function is selected or turned on, a metronome sound is output from the tuner/metronome 44 to the D/A converter section 42. The reference tone or the metronome sound is sounded via the phone terminal 81 or the internal speaker 57.

The LED level meter 71 indicates the input level of input sound, based on a signal having passed through the input level adjuster 69, and also indicates the output level of a song, based on a signal from the source file 11 having passed through the output level adjuster 70. Further, the LED level meter 71 indicates the input level of a signal input to the encoder 38 via the output line 34. The levels of the respective signals may be displayed on the display 61 instead of being indicated by the LED level meter 71.

It should be noted that when the recorder 20 is connected to a personal computer, not shown, via the USB terminal 55, it is possible to gain access to the files within the memory card 10 from the personal computer similarly to a case where an external drive is used by the personal computer, so that the files can be copied, deleted, or moved by operation from the personal computer, and if a software program is provided, even editing or handling of the files can be performed by operation from the personal computer.

Next, the operations of the recorder constructed as above will be described.

FIG. 4A to FIG. 6B schematically illustrate signal flows in the respective operations in association with FIGS. 2A and 2B. An Eff1 appearing in FIGS. 4A, 5A, 5B and 6A corresponds to the EQ 27, the DYN 28 and the EFF 29 in FIGS. 2A and 2B. The signal flow from the output of the EFF 29 to the switch section MSW is omitted. A mixing section MB (mixing device) corresponds to segments of the output line 34 appearing in FIGS. 2A and 2B from the switch section MSW to the inputs of the encoder 38 and the EFF 40 as well as from the switch section MSW to the output of the output level adjuster 70. An Eff2 corresponds to the EFF 40 and the EQ 41 appearing in FIGS. 2A and 2B.

Figure 4A:
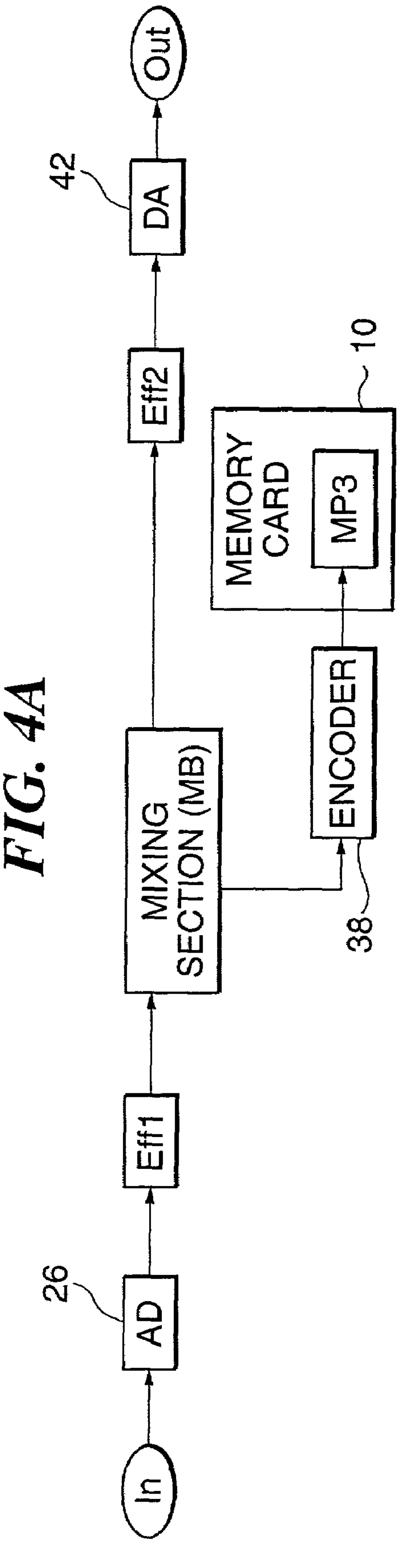

First, in simple recording of input sound, as shown in FIG. 4A, an analog audio signal input from selected input means (internal microphones 59, 60 or the like) is converted to a digital audio signal by the A/D converter section 26, and then subjected to processing including application of effects by the Eff1, followed by being input to the mixing section MB. Thereafter, the digital audio signal is output for reproduction via the Eff2 and the D/A converter section 42. At the same time, the digital audio signal is compressed by the encoder 38, and then stored as an MP3 file (non-mixed mixed file 12 in this case) in the memory card 10.

Figure 4B:
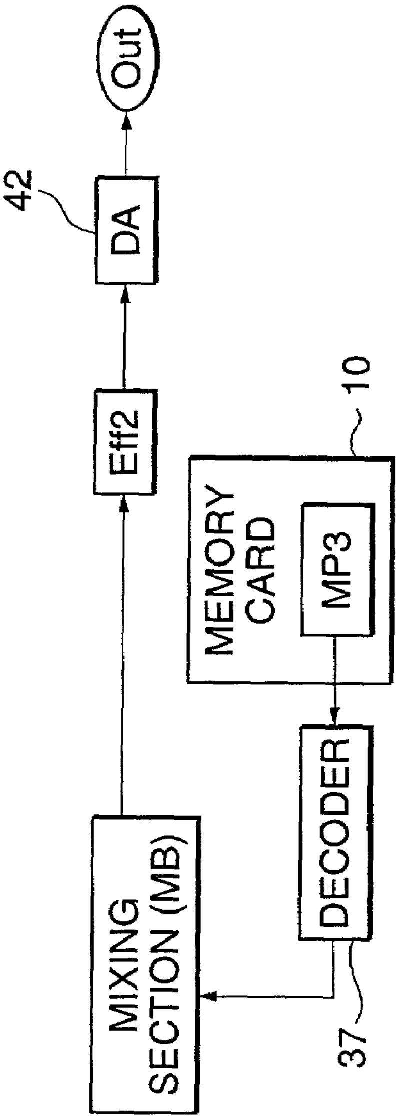

In reproduction of a song from the source file 11, as shown in FIG. 4B, an audio signal from the MP3 file (selected song in the source file 11 in this case) in the memory card 10 is extended to a digital audio signal by the decoder 37, and input to the mixing section MB, followed by being output for reproduction via the Eff2 and the D/A converter section 42.

Figure 5A:
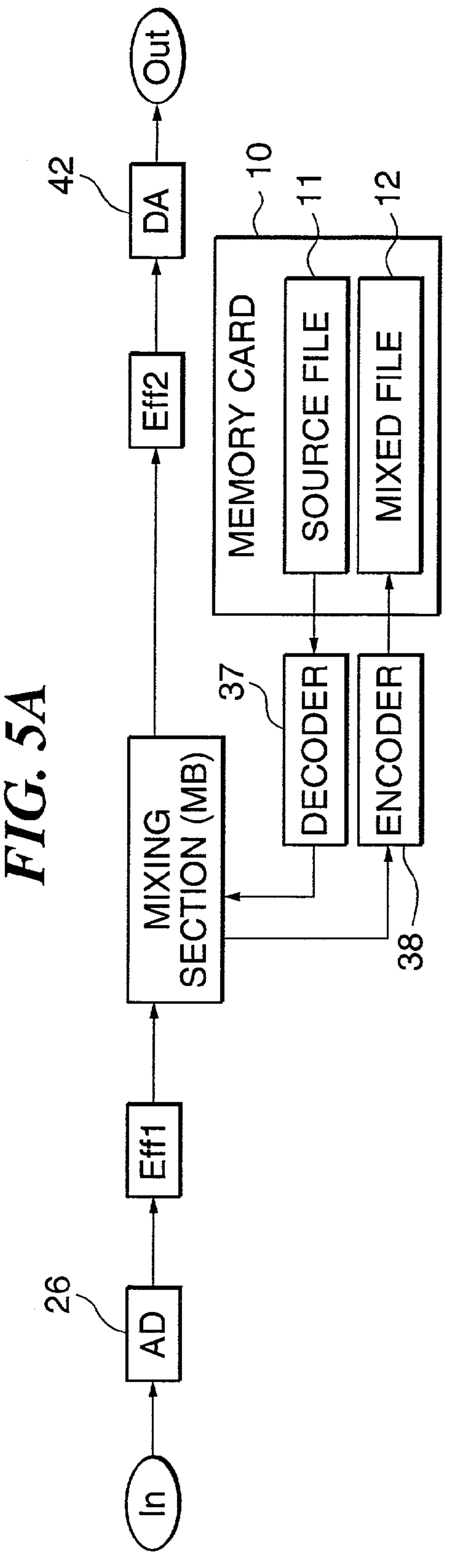

In recording with mixing, as shown in FIG. 5A, an input analog audio signal is converted to a digital audio signal by the A/D converter section 26, and then subjected to processing including application of effects by the Eff1, followed by being input to the mixing section MB. On the other hand, an audio signal from the source file 11 in the memory card 10 is extended to a digital audio signal by the decoder 37, and then input to the mixing section MB. The two digital audio signals input to the mixing section MB from the Eff1 and the decoder 37 respectively are mixed with each other, and output for reproduction via the Eff2 and the D/A converter section 42. At the same time, the mixed digital audio signal is compressed by the encoder 38, and then stored as a mixed file 12 in the memory card 10. Therefore, it is possible to carry out an audio input process while monitoring the audio output for reproduction. Further, since the mixed file 12 can be used as a new source file 11 on the next occasion of recording, it is possible to carry out overdubbing repeatedly without any substantial degradation of sound quality.

Figure 5B:
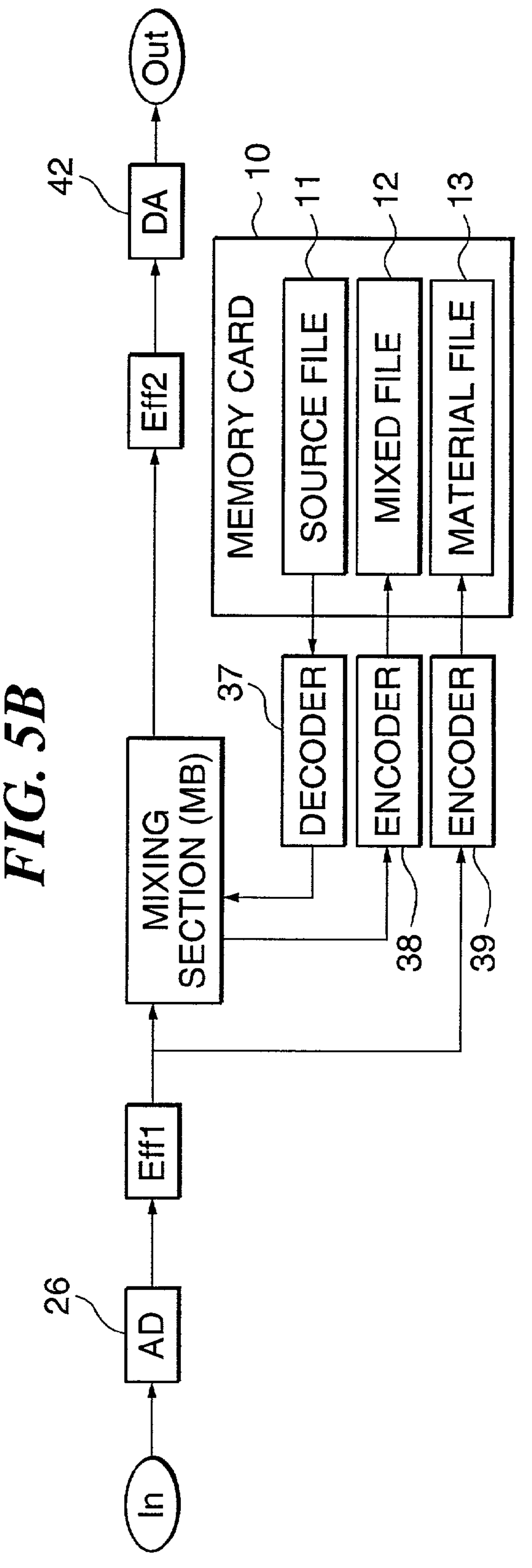

In recording with mixing carried out while generating a material file 13, as shown in FIG. 5B, in addition to execution of the FIG. 5A process, the digital audio signal from the Eff1 is compressed in the MP3 format by the encoder 39 and stored as the material file 13 in the memory card 10. The material file 13 can be used as a resource in later processing by a personal computer or the like.

Figures 6A, 6B, 6C:
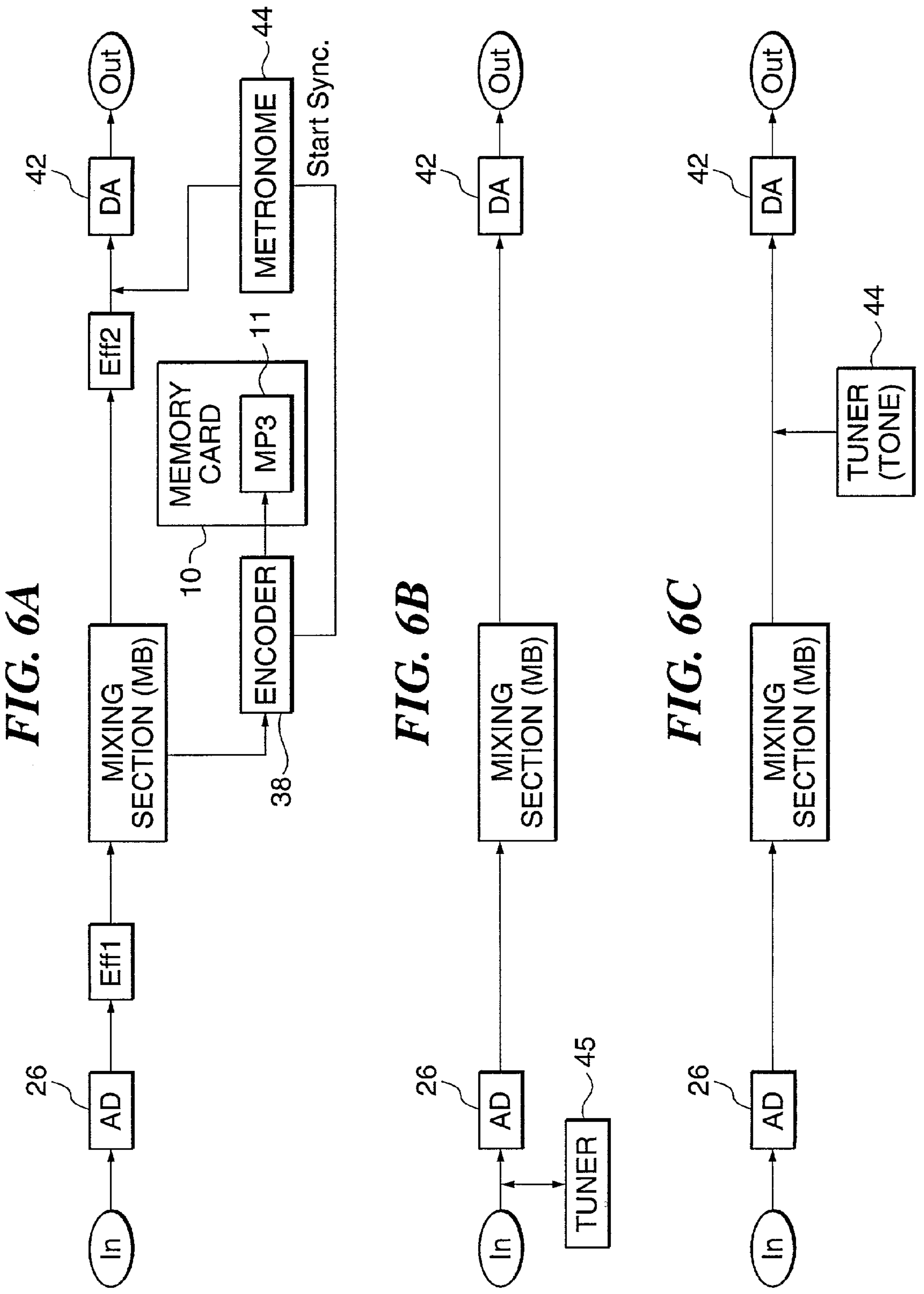

In recording carried out according to the operation of the metronome, as shown in FIG. 6A, in addition to execution of the FIG. 4A process, a synchronizing signal from the encoder 38 is used for a trigger for causing the tuner/metronome 44 to output a metronome sound. The metronome sound is sounded via the D/A converter section 42. It should be noted that the metronome function can be used for recording with mixing (FIGS. 5A, 5B) and real-time reproduction of input sound.

In the case of using the tuner function, as shown in FIG. 6B, a signal for causing the LED level meter 71 to blink according to the pitch of an input audio signal is delivered from the tuner 45 to the A/D converter section 26. In the case of using the tone generator function, as shown in FIG. 6C, the reference tone of the preset musical interval is output from the tuner/metronome 44 and sounded via the D/A converter section 42.

FIGS. 7A to 7D show examples of information displayed on the display 61.

The display 61 displays information according to operating conditions and setting conditions. The examples illustrated in FIGS. 7A to 7D particularly relate to execution and stop of simple recording and execution and stop of recording with mixing.

Figure 7A:
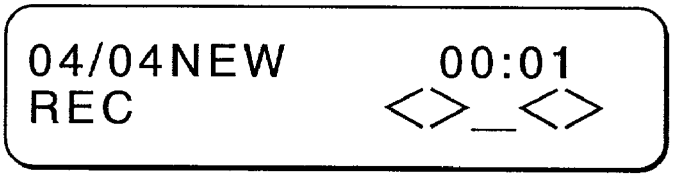
Figure 7B:

When simple recording is started, the rec button 76 (see FIG. 1) is lit, and at the same time, "REC" and on-recording characters "< >_< >" visually indicating that recording is being performed are displayed on the display 61 as shown in FIG. 7A. On the other hand, when the simple recording is stopped, a letter "U" is displayed as shown in FIG. 7B. The letter "U" indicates that undo processing can be executed, so that if the undo button 87 is depressed at this time point, an undo screen view, not shown, is displayed, and the immediately preceding recording processing is canceled by a predetermined operation, whereby an original state is restored.

Figure 7C:
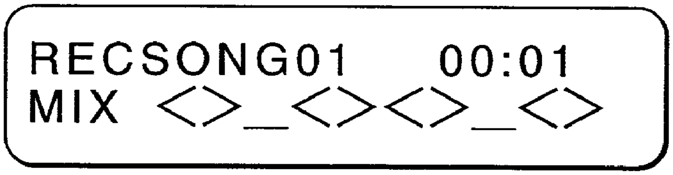
Figure 7D:
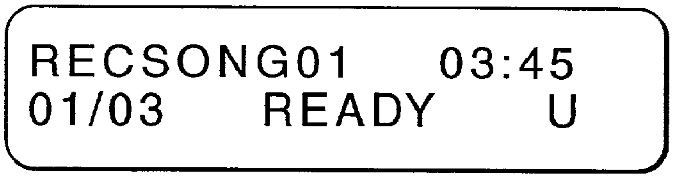

On the other hand, when recording with mixing is started, the mix button 77 (see FIG. 1) is lit, and at the same time, "MIX" and on-mix-recording characters "< >_< >< >_< >" (predetermined information) visually indicating that recording with mixing is being performed are displayed on the display 61, as shown in FIG. 7C, so as to allow the user to easily visually confirm that recording with mixing is being performed. The on-mix-recording characters "< >_< >< >_< >" are continuously displayed until the recording with mixing is stopped, but it may be configured such that the characters are displayed for a short time at the start of the recording with mixing. When the recording with mixing is stopped, the letter "U" is displayed as shown in FIG. 7D. If the undo button 87 is depressed at this time point, the undo screen view, not shown, is displayed, and the immediately preceding recording processing is canceled by a predetermined operation, whereby an original state is restored.

Indications for execution of recording and recording with mixing are not limited to those using the on-recording characters and the on-mix-recording characters, but LED's may be used in place of the characters displayed on the display 61.

Further, although in the present embodiment, the undo function can be used only once, this is not limitative, but the capacity of the undo buffer 31 may be increased so as to make it possible to carry out undo processing a plurality of times.

Figure 8:
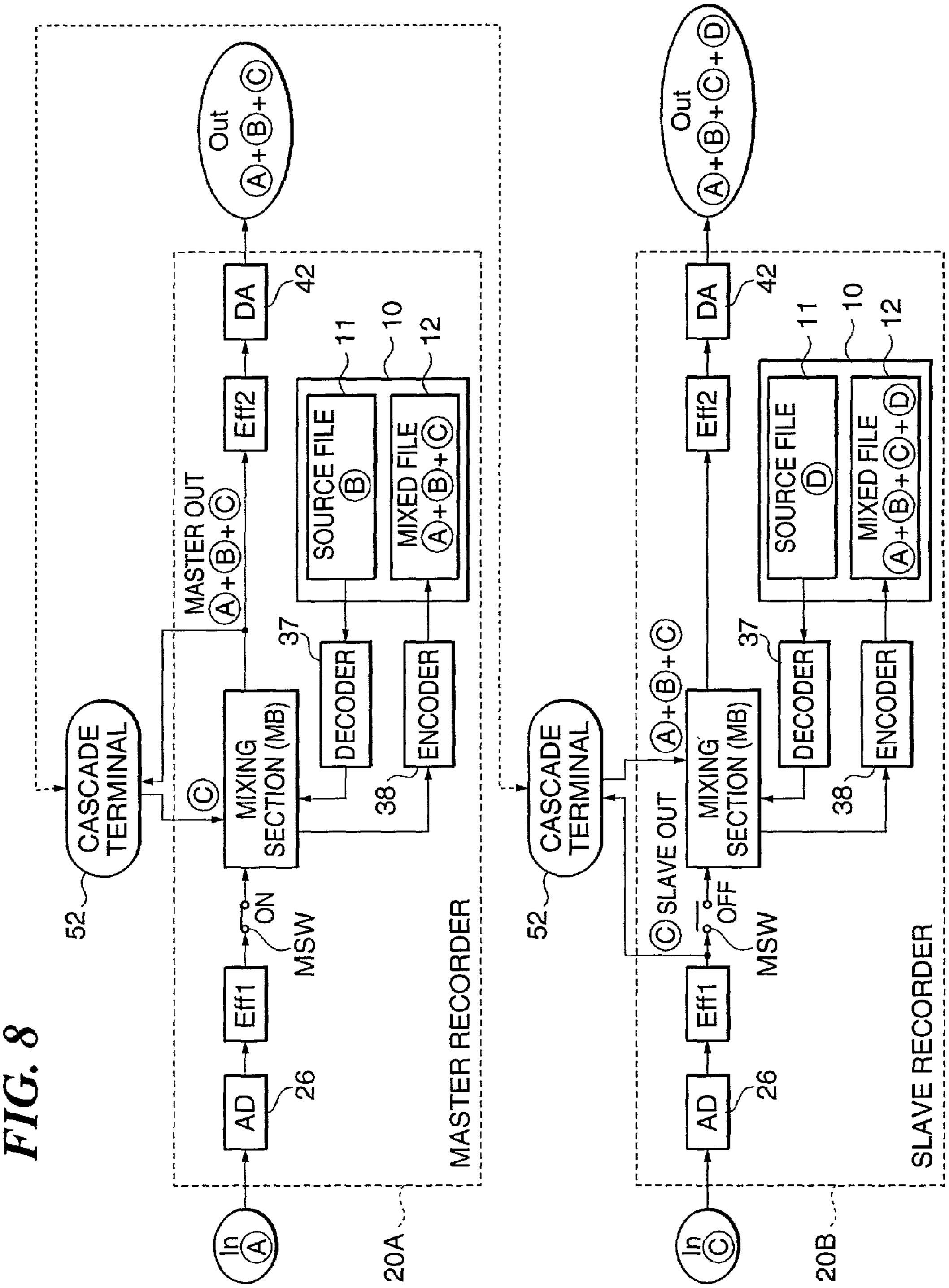
FIG. 8 is a block diagram showing signal flows in recording with mixing performed with two portable mixing recorders of the embodiment connected in cascade.

FIG. 8 shows signal flows in recording with mixing performed by connecting two portable mixing recorders of the present invention in cascade. In the figure, the two portable mixing recorders 20 identical in construction are connected to each other via the respective cascade terminals 52 (see FIG. 1). Hereinafter, one of the recorders 20 designated as a master will be referred to as the master recorder 20A, while the other recorder 20 designated as a slave will be referred to as the slave recorder 20B. As described hereinbefore, by depression of the master designation switch 58 of the master recorder 20A, the switch section MSW of the master recorder 20A is in an ON state, while the switch section MSW of the slave recorder 20B is in an OFF state. It should be noted that a signal flow in generation of a material file 13 is omitted in the figure.

In the following, an analog audio signal input via the input select section 25 of the master recorder 20A will be referred to as "the signal A", and an MP3 audio signal recorded in a source file 11 of the master recorder 20A will be referred to as "the signal B", while an analog audio signal input via the input select section 25 of the slave recorder 20B will be referred to as "the signal C", and an MP3 audio signal recorded in a source file 11 of the slave recorder 20B will be referred to as "the signal D". Further, each of these signals will be simply referred to similarly to the above irrespective of whether it is an analog signal or a digital signal.

In the master recorder 20A, first, the signal A and the signal B are input to the mixing section MB. Further, the signal C (slave-side input digital audio signal) output via the output line 8 of the slave recorder 20B is input to the mixing section MB via the cascade terminal 52. In the mixing section MB, a "signal A+B+C" formed as a digital audio signal by mixing the signal A, the signal B, and the signal C is generated. This "signal A+B+C" is output for reproduction via the Eff2 and the D/A converter section 42, and at the same time compressed by the encoder 38 and stored as a mixed file 12 in the memory card 10. Thus, the signal C becomes a signal for mixing, similarly to the signal A, so that signals which can be input simultaneously as analog audio signals are increased in number. Further, the "signal A+B+C" is output from the mixing section MB to the slave recorder 20B via the cascade terminal 52.

On the other hand, in the slave recorder 20B, the "signal A+B+C" input via the cascade terminal 52 and the signal D from the source file 11 are input to the mixing section MB. It should be noted that differently from the signal A, the signal C is not input to the mixing section MB via the Eff1, as described hereinabove, so as to prevent the signal from being looped. In the mixing section MB, a "signal A+B+C+D" formed as a digital audio signal by mixing the "signal A+B+C" and the signal D is generated. This "signal A+B+C+D" is output for reproduction via the Eff2 and the D/A converter section 42, and at the same time compressed by the encoder 38 and stored as a mixed file 12 in the memory card 10.

For accurate reproduction and recording of the "signal A+B+C+D", it is necessary to execute processing for synchronization of the "signal A+B+C" and the signal D. Therefore, the system may be configured such that in the case of cascade connection, the signal D can be inhibited from being read from the slave recorder 20B so as to cause only the signal A, the signal B and the signal C to be processed. In this case, the same reproduction and recording of the "signal A+B+C" as performed in the master recorder 20A can be performed simultaneously in the slave recorder 20B as well.

Next, processing (button operation processing) executed upon depression of the reproduction/recording button 72, the rec button 76, the mix button 77 or the pause button 78 will be described based on flowcharts shown in FIGS. 9 to 11.

As described hereinbefore, when the reproduction/recording button 72 is operated in a recording standby state, i.e. in a state in which the rec button 76 has been operated, simple recording is started. This simple recording is continuously performed until the reproduction/recording button 72 is operated again (processing 1). When the reproduction/recording button 72 is operated in a recording-with-mixing standby state, i.e. in a state in which the mix button 77 has been operated, the recording with mixing is started. This recording with mixing is continuously performed until the reproduction/recording button 72 is operated again (processing 2). When the reproduction/recording button 72 is operated in a state other than the recording standby state and the recording-with-mixing standby state, a currently selected source file is reproduced. Then, when the pause button 78 is operated during the reproduction of the source file, the reproduction is temporarily stopped (processing 3). When the pause button 78 is operated again in the pause state, the pause state is canceled, and the reproduction state is restored (processing 4), whereas when the mix button 77 is operated in the pause state, the recording with mixing from the temporary stop position is started (processing 5).

The processing 1 described above is realized by steps S1 to S5 in FIG. 9, and the processing 2 by steps S6 to S12 in the figure. The processing 3 is realized by steps S13 in FIG. 10 and steps S21, S22 in FIG. 11, and the processing 4 by steps S23, S24 in FIG. 11 and steps S15, S16 in FIG. 10. Further, the processing 5 is realized by the steps S23, S24 and steps S26 to S32 in FIG. 11, the step S15 in FIG. 10, and "return" in FIG. 9.

Figure 9:
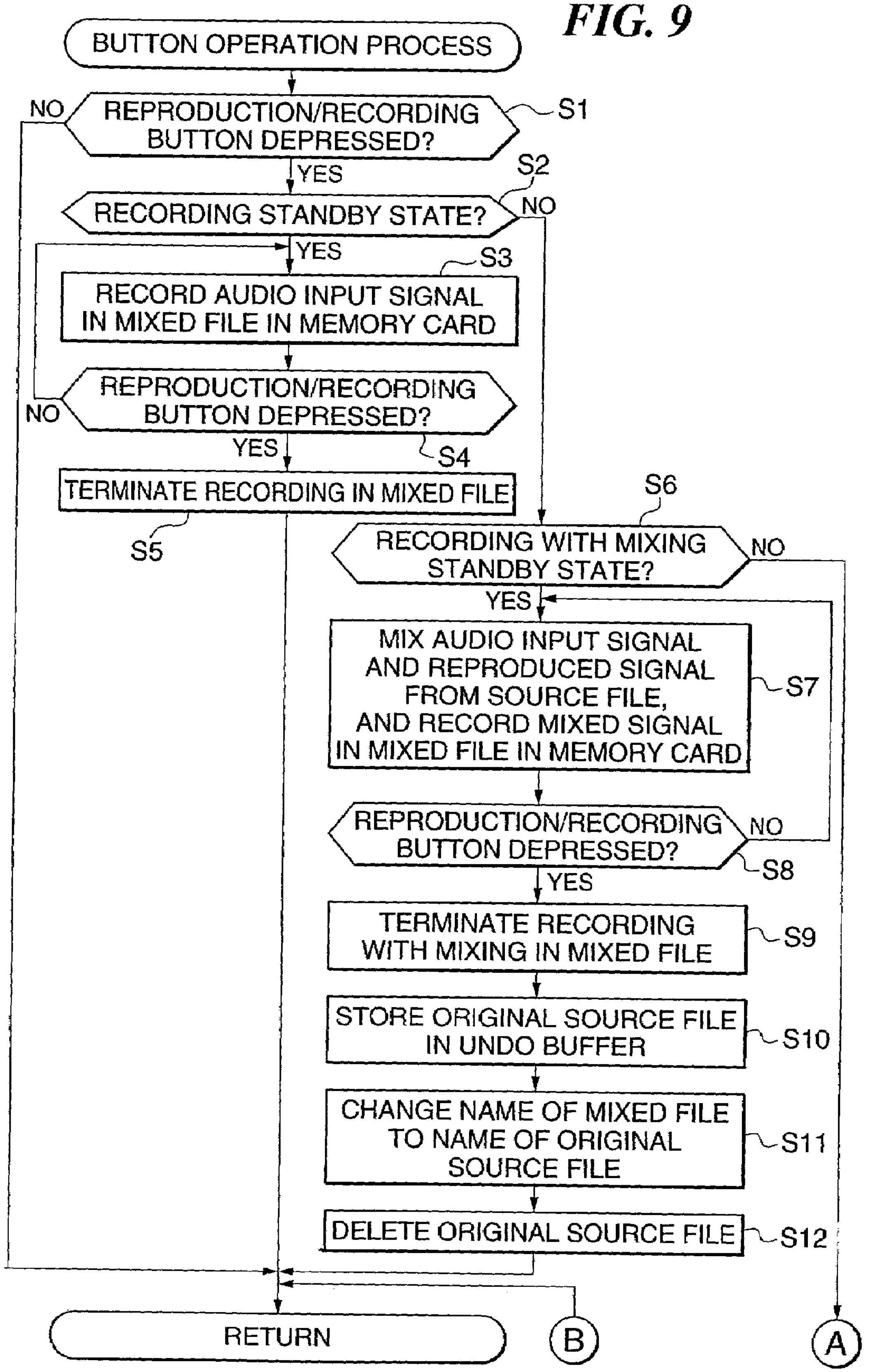
FIG. 9 is a flowchart showing a procedure for carrying out button operation processing which is executed by a CPU appearing in FIG. 3.
Figure 10:
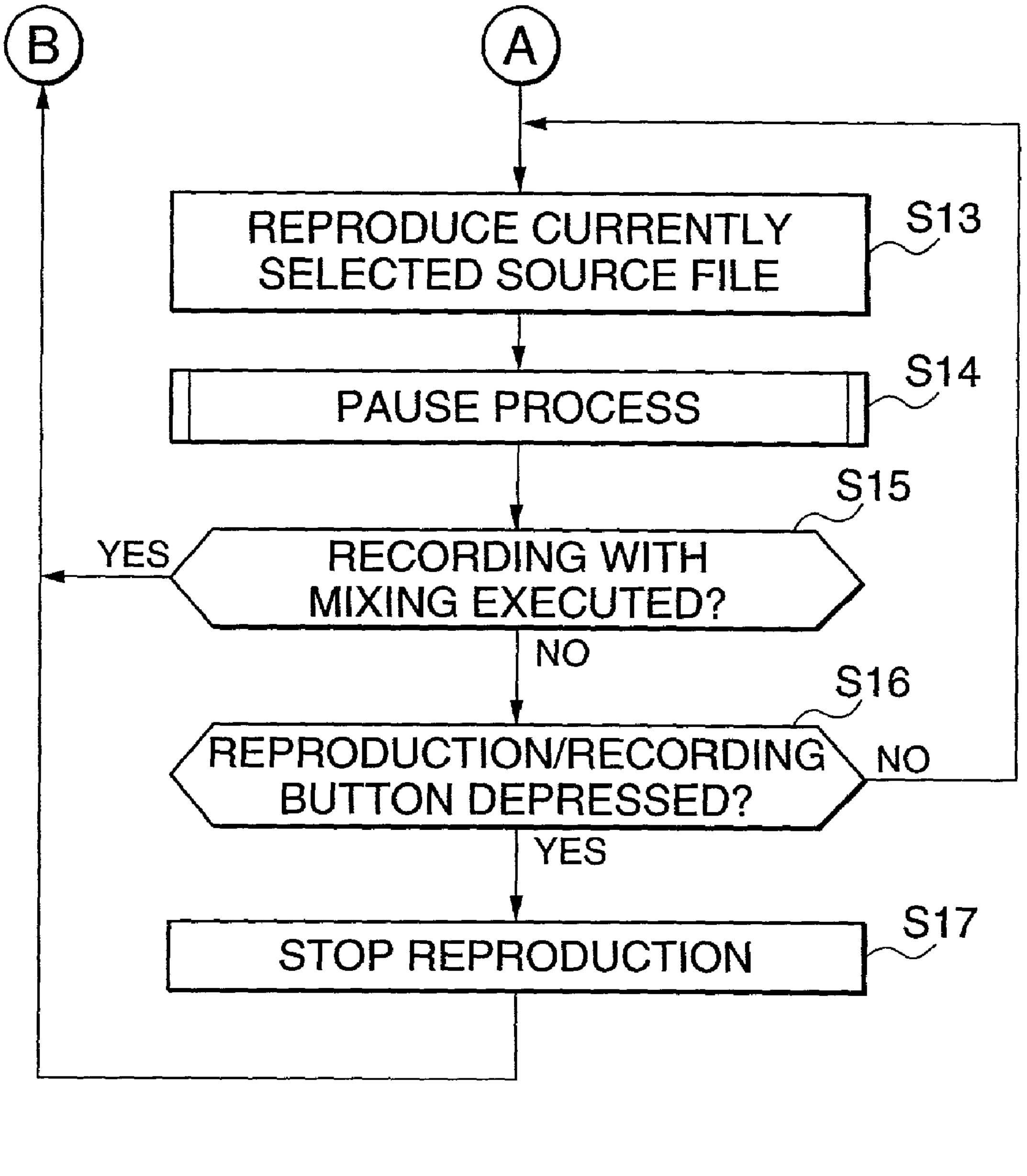
FIG. 10 is a continued part of the FIG. 9 flowchart.

Referring to FIG. 9, when the reproduction/recording button 72 is depressed, if the rec button 76 is on, i.e. if the recorder is in the recording standby state, as described with reference to FIG. 4A, an analog audio signal input via selected input means is converted to a digital audio signal, and then stored as a non-mixed mixed file 12 in the memory card 10 (S1→S2→S3).

The operation for recording in the mixed file 12 is continued until the reproduction/recording button 72 is depressed again (S3→S4→S3). When the button 72 is depressed, the recording of the signal in the mixed file 12 is terminated, and the mixed file 12 becomes a source file with a new name (S4→S5).

On the other hand, when the reproduction/recording button 72 is depressed, if the mix button 77 is on, i.e. if the recorder is in the recording-with-mixing standby state, as described with reference to FIG. 5A, an analog audio signal input via selected input means is converted to a digital audio signal, and then mixed with a digital audio signal read out from the source file 11 and reproduced, followed by being stored as a mixed file 12 in the memory card 10 (S1→S2→S6→S7).

The operation (recording with mixing) for recording the signal in the mixed file 12 is continued until the reproduction/recording button 72 is depressed again (S7→S8→S7). Then, when the button 72 is depressed, the recording of the signal in the mixed file 12 is stopped, and the original source file 11 is temporarily stored in the undo buffer 31. Thereafter, the name of the mixed file 12 is changed to the name of the original source file 11, and the original source file 11 is deleted(S8→S9→S10→S11→S12).

When the reproduction/recording button 72 is depressed, if the recorder is neither in the recording standby state nor in the recording-with-mixing standby state, it is judged that the button 72 was depressed simply for giving an instruction for reproduction, and a currently selected source file 11 is reproduced (S13). Then, after a pause processing subroutine, described in detail hereinafter with reference to FIG. 11, is executed (S14), it is determined whether or not recording with mixing has been carried out by the pause processing subroutine (S15). If the recording with mixing has not been carried out, the steps S13 to S15 are repeatedly executed until the reproduction/recording button 72 is depressed again. Then, when the reproduction/recording button 72 is depressed, the reproduction is stopped (S17).

Figure 11:
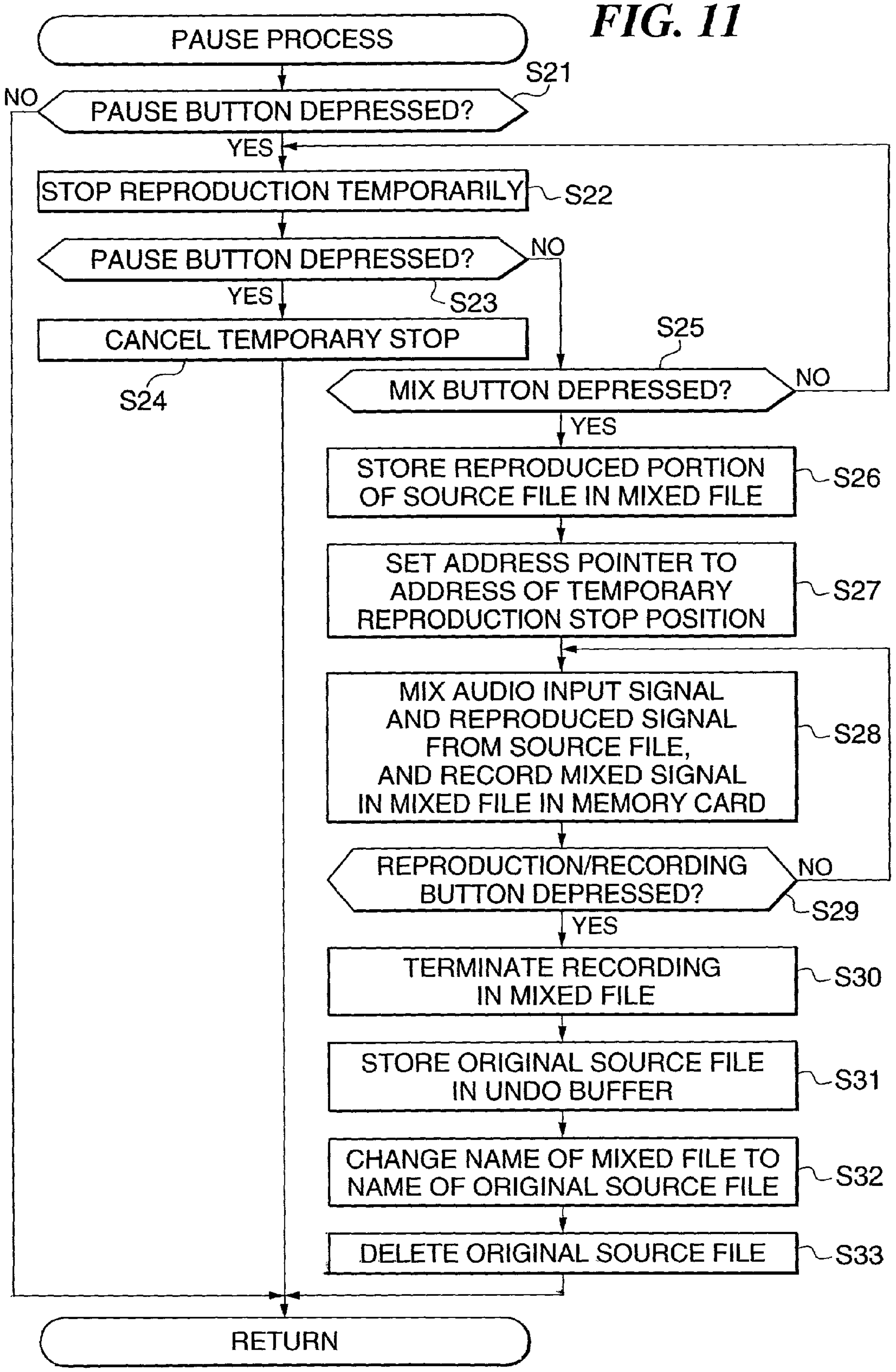
FIG. 11 is a flowchart showing a procedure for carrying out a pause processing subroutine appearing in FIG. 10.

FIG. 11 shows steps of the pause processing subroutine in detail.

In the figure, when the pause button 78 is depressed, the reproduction is temporarily stopped or interrupted (S21→S22). Thereafter, as long as neither the pause button 78 nor the mix button is depressed, the temporary stop state is maintained (S23→S25→S22).

When the pause button 78 is depressed again in the temporary stop state of the reproduction, the temporary stop state is canceled (S23→S24).

On the other hand, when the mix button 77 is depressed in the temporary stop state of the reproduction, data of the digital audio signal reproduced so far from the source file 11 is recorded in the mixed file 12, and an address pointed by a writing pointer, not shown, for writing a digital audio signal in the mixed file 12 is set to the temporary stop position where the reproduction was interrupted. Then, mixing of the digital input audio signal (obtained by A/D conversion of the analog signal input from the selected input means) and the digital audio signal read from the source file 11 and reproduced is started from the temporary stop position, and the mixed digital signal is recorded in a mixed file 12 stored in the memory card 10 (S25→S26→S27→S28).

The step S28 is repeatedly executed until the reproduction/recording button 72 is depressed. Then, when the button 72 is depressed, the same processing as executed at the steps S9 to S12 is carried out (S30 to S33)

Figure 12:
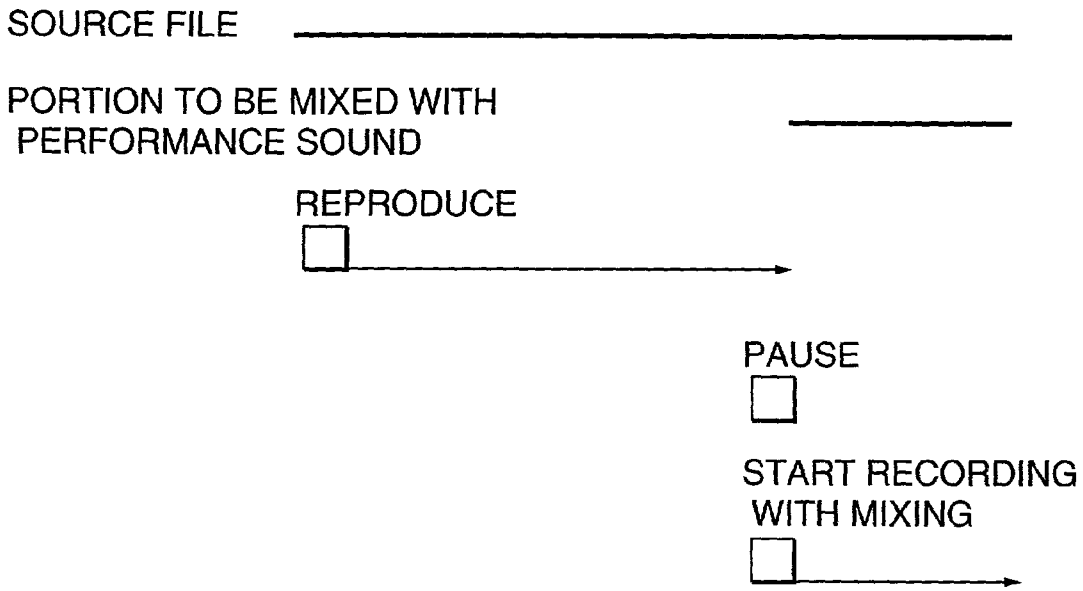
FIG. 12 is a diagram useful in explaining an operating procedure for performing recording with mixing only on a portion of a source file, by using the portable mixing recorder of the embodiment.
Figure 13:
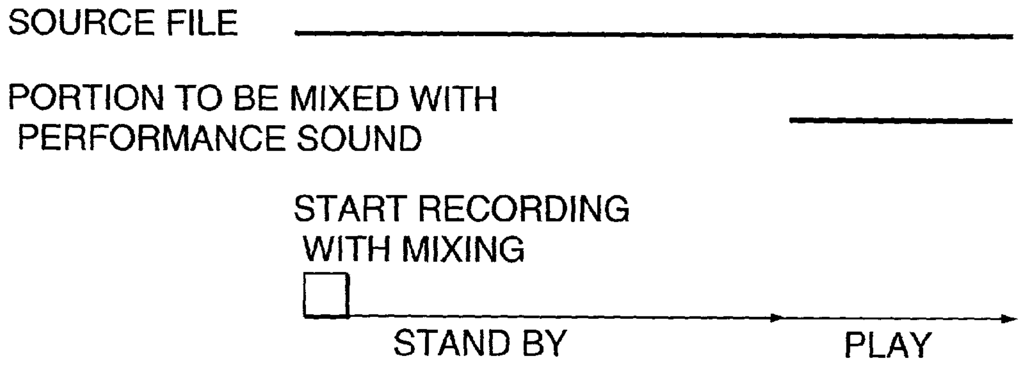
FIG. 13 PRIOR ART
FIG. 13 is a diagram useful in explaining an operating procedure for performing recording with mixing only on a portion of a source file, by using a conventional portable mixing recorder.

FIG. 12 shows an operating procedure of recording with mixing which is performed only on a portion of the source file 11 by the use of the portable mixing recorder of the present embodiment.

As shown in the figure, first, the reproduction/recording button 72 is depressed to start reproduction of the source file 11. Then, at a time point the reproduction proceeds to a desired position for starting the recording with mixing, the pause button 78 is depressed to stop the reproduction temporarily. Then, if a digital audio signal for the recording with mixing is from a musical instrument, the musical instrument is made ready for performance. When the instruction is ready, the mix button 77 is depressed to start the recording with mixing.

As described above, according to the present embodiment, when recording with mixing is desired to be performed only on a portion of the source file 11, the other portion of the source file 11 on which the user does not want to carry out the recording with mixing is only reproduced, so that as is distinct from the conventional multi-channel recorder, the user is not held in a standby state for the recording with mixing, and no signal other than an audio signal for the recording with mixing can be picked. This enables the user to concentrate on the performance or other necessary operation for the recording with mixing. Further, in the present embodiment, since the two kinds of buttons, i.e. the rec button 76 for designating simple recording and the mix button 77 for designating recording with mixing are provided as separate means, the user can select an intended recording operation (or enter a standby state for the recording operation) simply by depressing a button corresponding to the recording operation. Thus, the user is made free from hesitating in button operation, which enhances the operability of the recorder.

Further, according to the present embodiment, an audio signal input as an analog audio signal and a compressed audio signal recorded in a source file 11 are converted to respective digital audio signals, and mixed with each other, and then the resulting mixed audio signal is compressed to be recorded in a new source file for storage. Moreover, the new source file can be utilized as an original source file on the next occasion of recording, so that by repeatedly carrying out overdubbing as in the case of the multi-channel recorder, it is possible to complete a musical piece formed of a number of multiplexed audio signals. Further, the portability of the present recorder is convenient e.g. when the recorder is required to be carried to specific musical instrument players for mixing. Furthermore, since the mixing is performed with digitalized audio signals, even if overdubbing is repeatedly carried out, sound quality is hardly degraded, and hence the present embodiment is suitable for use in music production. In addition, since the mixed digital audio signal is recorded after being compressed to a compressed audio signal, the memory capacity of the recorder can be reduced, which contributes to improvement of the portability of the recorder. Thus, the present embodiment makes it possible to easily produce music by using the overdubbing and other techniques while suppressing degradation of sound quality to the minimum, away from home, without excessive concern for space restriction.

Further, in the present embodiment, when a mixed file 12 is stored as a new source file, the original source file 11 is temporarily stored in the undo buffer 31, and therefore, for example, when the recording with mixing is not successful or recorded sound is not satisfactory, it is possible to readily retry the recording with mixing by using the original source file 11 temporarily stored in the undo buffer 31, which enhances the operability of the recorder in music production.

Furthermore, in the present embodiment, simultaneously with recording of a mixed file 12, a material file 13 is stored as a file separate from the mixed file 12, and therefore, for example, when the final result of mixing performed by repetition of overdubbing is not pleasing, the material file 13 can be processed afterward by using a personal computer or the like. Thus, it is possible to make use of the material file 13 afterward, which improves the operability of the recorder in music production.

Moreover, since the on-recording-with mixing characters are displayed during recording with mixing, it is possible to visually confirm that the recording with mixing is under way, which further enhances the operability of the recorder.

Further, in the present embodiment, the use of another portable mixing recorder as the slave recorder 20B in cascade connection makes it possible to add an input signal from the slave recorder 20B to audio signals for mixing, and hence it is possible to increase the number of input signals which can be mixed down at a time, thereby enhancing efficiency in music production.

It should be noted that more than two portable mixing recorders may be connected in cascade. In this case, recorders each provided with a master-in terminal and a slave-out terminal in place of the cascade terminal 52 may be connected in series in such a manner that the master-in terminal of one recorder on a superordinate side is connected to the slave-out terminal of another recorder on a subordinate side to thereby define the master-slave relation between them. As a result, the number of input signals which can be mixed down at a time can be increased by the number of slave recorders in the cascade connection.

Although in the present embodiment, audio signals are compressed in the MP3 format, this is not limitative, but other compression formats, such as the Twin VQ (Transform-Domain Weighted Interleave Vector Quantization) and the AFS (Advanced Streaming Format), may be employed.

Further, the memory card 10 may be replaced by another type of removable storage medium, or alternatively, may be replaced by a stationary storage medium provided in the body of the recorder 20.

It is to be understood that that the object of the invention can also be achieved by supplying a control program to the recorder via a storage medium storing the software program for realizing the above described embodiment. In this case, the program code read from the storage medium achieves the novel functions of the present invention, and hence the storage medium storing the program code constitutes the present invention. When the recorder is provided with a communication interface, and the program code is supplied to the recorder via a transmission medium or the like, the program code itself constitutes the present invention. The storage medium used for supplying the program code may be a floppy disk, a hard disk, an optical memory disk, a CD-ROM, a CD-R, a magnetic tape, a nonvolatile memory card, or the like.

Further, it is to be understood that the functions of the illustrated embodiment may be accomplished not only by executing the program code read out by a computer, but also by causing an OS or the like operating on the computer to perform a part of or all of actual operations according to the instructions of the program code. Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A portable mixing recorder comprising:

an input and conversion device that receives a maximum of a pair of analog audio signals and converts the pair of analog audio signals to a pair of first digital audio signals;

a decoding device that reads out a pair of compressed audio signals from an original source file stored in a predetermined memory and having the pair of compressed audio signals recorded therein, and then extends the pair of compressed audio signals into a pair of second digital audio signals;

a mixing device that mixes the pair of first digital audio signals and the pair of second digital audio signals into a pair of third digital audio signals;

a first encoding device that compresses the pair of third digital audio signals into a pair of compressed audio signals; and a storage control device that causes the pair of compressed audio signals obtained by said first encoding device to be stored in the predetermined memory, as a new source file, wherein said decoding device, said mixing device, and said first encoding device are repeatedly operated to complete a musical piece formed of a pair of multiplexed and compressed audio signals.

2. A portable mixing recorder according to claim 1, further comprising an undo buffer, and wherein when causing the new source file to be stored in the predetermined memory, said storage control device causes the original source file to be temporarily stored in said undo buffer and causes the original source file to be deleted from the predetermined memory.

3. A portable mixing recorder according to claim 1, further comprising a second encoding device that compresses the pair of first digital audio signals into a pair of compressed audio signals, and wherein when causing the new source file to be stored in the predetermined memory, said storage control device causes the pair of compressed audio signals obtained by said second encoding device to be stored in the predetermined memory, as a separate file different from the new source file.

4. A portable mixing recorder according to claim 1, further comprising a display device that displays predetermined information indicating that the new source file is stored in the predetermined memory when said storage control device causes the new source file to be stored in the predetermined memory.

5. A portable mixing recorder according to claim 1, further comprising a connection device that connects at least one other portable mixing recorder as a slave recorder to the portable mixing recorder in cascade, and a slave input device that receives from the slave recorder connected in cascade by said connection device a pair of slave-side input digital audio signals obtained by converting a pair of analog audio signals input to the slave recorder to a pair of digital audio signals, and wherein said mixing device mixes the pair of first digital audio signals, the pair of second digital audio signals, and the pair of slave-side input digital audio signals received by said slave input device.

6. A portable mixing recorder comprising:

a memory that stores files having recorded therein respective compressed digital audio signals, including a source file having a compressed digital audio signal recorded therein;

an input and conversion device that receives an analog audio signal and converts the analog audio signal to a first digital audio signal;

a first level adjustment device that adjusts a level of the first digital audio signal;

a decoding device that reads out the compressed audio signal from the source file, and extends the compressed audio signal into a second digital audio signal;

a second level adjustment device that adjusts a level of the second digital audio signal;

a mixing device that mixes the first digital audio signal subjected to the level adjustment by said first level adjustment device and the second digital audio signal subjected to the level adjustment by said second level adjustment device into a third digital audio signal;

an encoding device that compresses the third digital audio signal into a compressed audio signal; and a storage control device that causes the compressed audio signal obtained by said encoding device to be stored in said memory, wherein said source file is substantially overwritten by the compressed audio signal obtained by said encoding device.

7. A portable mixing recorder according to claim 6, further comprising an undo buffer, and wherein when causing the compressed audio signal to be stored in said memory, said storage control device causes the source file to be temporarily stored in said undo buffer.

8. A portable mixing recorder comprising:

a memory that stores files having recorded therein respective compressed digital audio signals, including a source file having a compressed digital audio signal recorded therein;

an input and conversion device that receives an analog audio signal and converts the analog audio signal to a first digital audio signal;

an effect applying device that applies a predetermined kind of effect to the first digital audio signal;

a decoding device that reads out the compressed audio signal from the source file, and extends the compressed audio signal into a second digital audio signal;

a mixing device that mixes the first digital audio signal having the predetermined kind of effect applied thereto by said effect applying device and the second digital audio signal into a third digital audio signal;

an encoding device that compresses the third digital audio signal into a compressed audio signal; and a storage control device that causes the compressed audio signal obtained by said encoding device to be stored in said memory, wherein said source file is substantially overwritten by the compressed audio signal obtained by said encoding device.

9. A portable mixing recorder comprising:

an internal microphone;

an input and conversion device that receives a maximum of a pair of analog audio signals from the internal microphone and converts the pair of analog audio signals to a pair of first digital audio signals;

a reproduction device that reproduces a pair of second digital audio signals from a source file stored in a predetermined memory;

a recording instruction switch that is operable to instruct recording of the pair of first digital audio signals in the predetermined memory;

a recording-with-mixing instruction switch that is provided independently of said recording instruction switch, and is operable to instruct mixing of the pair of first digital audio signals and the pair of second digital audio signal into a pair of third digital audio signals signal, and recording of the pair of third digital audio signals in the predetermined memory; and a control device that causes the pair of first digital audio signals to be stored in the memory when said recording instruction switch is operated by a user, and causes the pair of first digital audio signals and the pair of second digital audio signals to be mixed into a pair of third digital audio signals, and the pair of third digital audio signals to be stored in the memory when said recording-with-mixing instruction switch is operated by the user wherein said recording-with-mixing instruction switch and said control device are repeatedly operated to complete a musical piece formed of a pair of multiplexed audio signals.

10. A portable mixing recorder according to claim 9, wherein the source file has a compressed digital audio recorded therein, and said reproduction device reproduces the pair of second digital audio signals by reading out the compressed digital audio from the source file and extending the compressed digital audio signal, and wherein when the pair of first digital audio signals is to be stored in the memory, said control device causes the pair of first digital audio signals to be compressed and then stored in the predetermined memory, while when the pair of third digital audio signals is to be stored in the memory, said control device causes the pair of third digital audio signals to be compressed and then stored in the memory.

11. A portable mixing recorder comprising:

an input and conversion device that receives a maximum of a pair of analog audio signals and converts the pair of analog audio signals to a pair of first digital audio signals;

a reproduction device that reproduces a pair of second digital audio signals from a source file stored in a predetermined memory;

a recording-with-mixing instruction switch that is operable to instruct mixing of the pair of first digital audio signals and the pair of second digital audio signals into a pair of third digital audio signals, and recording of the pair of third digital audio signals in the predetermined memory;

a temporary stop instruction switch that is operable to instruct said reproduction device to temporarily stop reproduction of the pair of second digital audio signals; and a control device that, when said recording-with-mixing instruction switch is operated by a user while the reproduction of the pair of second digital audio signals is temporarily stopped by the temporary stop instruction switch, causes the first pair of digital audio signals and the pair of second digital audio signals to be mixed starting from a position where the reproduction was temporarily stopped, and then causes the pair of third digital audio signals to be stored in the memory, wherein said recording-with-mixing instruction switch, said temporary stop instruction switch, and said control device are repeatedly operated to complete a musical piece formed of a pair of multiplexed audio signals.

12. A portable mixing recorder according to claim 11, wherein the source file has a compressed digital audio recorded therein, and said reproduction device reproduces pair of the second digital audio signals by reading out the compressed digital audio from the source file and extending the compressed digital audio signal, and wherein said control device causes the pair of third digital audio signals to be compressed and then stored in the memory.

13. A control method of controlling a portable mixing recorder, comprising the steps of:

receiving and converting a pair of analog audio signals to a pair of first digital audio signals;

reading out a pair of compressed audio signals from an original source file stored in a predetermined memory and having the pair of compressed audio signals recorded therein, and then extending the pair of compressed audio signals into a pair of second digital audio signals;

mixing the pair of first digital audio signals and the pair of second digital audio signals into a pair of third digital audio signals;

compressing the pair of third digital audio signals into a pair of compressed audio signals;

causing the pair of compressed audio signals obtained by the step of compressing the pair of third digital audio signals to be stored in the predetermined memory, as a new source file, wherein said steps of receiving and converting, reading out, mixing, compressing, and causing are repeatedly operated to complete a musical piece formed of a pair of multiplexed and compressed audio signals.

14. A control method of controlling a portable mixing recorder, comprising the steps of:

converting an input analog audio to a first digital audio signal;

adjusting a level of the first digital audio signal;

reading out the compressed digital audio from a memory storing files having recorded therein respective compressed digital audio signals, including a source file having a compressed digital audio recorded therein, and then extending the compressed digital audio into a second digital audio signal;

adjusting a level of the second digital audio signal;

mixing the first digital audio subjected to the level adjustment by the step of adjusting the level of the first digital audio and the second digital audio subjected to the level adjustment by the step of adjusting the level of the second digital audio into a third digital audio signal;

compressing the third digital audio signal into a compressed audio signal; and causing the compressed audio signal obtained by the step of compressing the third digital audio signal to be stored in the predetermined memory, wherein said source file is substantially overwritten by the compressed audio signal obtained by said encoding device.

15. A control method of controlling a portable mixing recorder, comprising the steps of:

converting an input analog audio signal to a first digital audio signal;

applying a predetermined kind of effect to the first digital audio signal; reading out the compressed digital audio from a memory storing files having recorded therein respective compressed digital audio signals, including a source file having a compressed digital audio recorded therein, and then extending the compressed digital audio signal into a second digital audio signal;

mixing the first digital audio signal having the predetermined kind of effect applied thereto by the step of imparting the first predetermined of effect and the second digital audio signal into a third digital audio signal;

compressing the third digital audio into a compressed audio signal; and causing the compressed audio signal obtained by the step of compressing the third digital audio signal to be stored in the predetermined memory, wherein said source file is substantially overwritten by the compressed audio signal obtained by said encoding device.

16. A control method of controlling a portable mixing recorder, said portable mixing recorder having an internal microphone, comprising the steps of:

receiving from the internal microphone a maximum of a pair of input analog audio signals;

converting the pair of input analog audio signal to a first digital audio signal;

reproducing a pair of second digital audio signals from a source file stored in a predetermined memory;

causing the pair of first digital audio signals to be stored in the memory when a recording instruction switch is operated by a user, causing the pair of first digital audio signals and the pair of second digital audio signals to be mixed into a pair of third digital audio signals when a recording-with-mixing instruction switch that is provided independently of said recording instruction switch is operated by the user, and then causing the pair of third digital audio signals to be stored in the predetermined; and repeating said steps of receiving, converting, reproducing, and causing to complete a musical piece formed of a pair of multiplexed audio signals.

17. A control method of controlling a portable mixing recorder, comprising the steps of:

receiving a maximum of a pair of input analog audio signals;

converting an the pair of input analog audio signals to a pair of first digital audio signals;

reproducing a pair of second digital audio signals from a source file stored in a predetermined memory;

causing the pair of first digital audio signals and the pair of second digital audio signals to be mixed into a pair of third digital audio signals when a recording-with-mixing instruction switch is operated by a user after reproduction of the pair of second digital audio signals is temporarily stopped by a temporary stop instruction switch, starting from a position where the reproduction was temporarily stopped, and then causing the pair of third digital audio signals to be stored in the predetermined memory; and repeating said steps of receiving, converting, reproducing, and causing to complete a musical piece formed of a pair of multiplexed audio signals.

18. A program embodied on a computer-readable medium for causing a computer to execute a control method of controlling a portable mixing recorder, the method comprising the steps of:

receiving and converting a pair of analog audio signals to a pair of first digital audio signals;

reading out a pair of compressed audio signals from an original source file stored in a predetermined memory and having the pair of compressed audio signals recorded therein, and then extending the pair of compressed audio signals into a pair of second digital audio signals;

mixing the pair of first digital audio signals and the pair of second digital audio signals into a pair of third digital audio signals;

compressing the pair of third digital audio signals into a pair of compressed audio signals;

causing the pair of compressed audio signals obtained by the step of compressing the pair of third digital audio signals to be stored in the predetermined memory, as a new source file, wherein said steps of receiving and converting, reading out, mixing, compressing, and causing are repeatedly operated to complete a musical piece formed of a pair of multiplexed and compressed audio signals.

19. A program embodied on a computer-readable medium for causing a computer to execute a control method of controlling a portable mixing recorder, the method comprising the steps of:

converting an input analog audio to a first digital audio signal;

adjusting a level of the first digital audio signal;

reading out the compressed digital audio signal from a memory storing files having recorded therein respective compressed digital audio signals, including a source file having a compressed digital audio signal recorded therein, and then extending the compressed digital audio signal into a second digital audio signal;

adjusting a level of the second digital audio signal;

mixing the first digital audio signal subjected to the level adjustment by the step of adjusting the level of the first digital audio signal and the second digital audio subjected to the level adjustment by the step of adjusting the level of the second digital audio signal into a third digital audio signal;

compressing the third digital audio signal into a compressed audio signal; and causing the compressed audio signal obtained by the step of compressing the third digital audio signal to be stored in the predetermined memory, wherein said source file is substantially overwritten by the compressed audio signal obtained by said encoding device.

20. A program embodied on a computer-readable medium for causing a computer to execute a control method of controlling a portable mixing recorder, the method comprising the steps of:

converting an input analog audio signal to a first digital audio signal;

applying a predetermined kind of effect to the first digital audio signal;

reading out the compressed digital audio signal from a memory storing files having recorded therein respective compressed digital audio signals, including a source file having a compressed digital audio recorded therein, and then extending the compressed digital audio signal into a second digital audio signal;

mixing the first digital audio signal having the predetermined kind of effect applied thereto by the step of applying the predetermined kind of effect and the second digital audio signal into a third digital audio signal;

compressing the third digital audio signal into a compressed audio signal; and causing the compressed audio signal obtained by the step of compressing the third digital audio to be stored in the predetermined memory, wherein said source file is substantially overwritten by the compressed audio obtained by said encoding device.

21. A program embodied on a computer-readable medium for causing a computer to execute a control method of controlling a portable mixing recorder, said portable mixing recorder having an internal microphone, the method comprising the steps of:

receiving from the internal microphone a maximum of a pair of input analog audio signals;

converting the pair of input analog audio signal to a first digital audio signal;

reproducing a pair of second digital audio signals from a source file stored in a predetermined memory;

causing the pair of first digital audio signals to be stored in the memory when a recording instruction switch is operated by a user, causing the pair of first digital audio signals and the pair of second digital audio signals to be mixed into a pair of third digital audio signals when a recording-with-mixing instruction switch that is provided independently of said recording instruction switch is operated by the user, and then causing the pair of third digital audio signals to be stored in the predetermined; and repeating said steps of receiving, converting, reproducing, and causing to complete a musical piece formed of a pair of multiplexed audio signals.

22. A program embodied on a computer-readable medium for causing a computer to execute a control method of controlling a portable mixing recorder, the method comprising the steps of:

receiving a maximum of a pair of input analog audio signals;

converting the pair of input analog audio signals to a pair of first digital audio signals;

reproducing a pair of second digital audio signals from a source file stored in a predetermined memory;

causing the pair of first digital audio signals and the pair of second digital audio signal signals to be mixed into a pair of third digital audio signals when a recording-with-mixing instruction switch is operated by a user after reproduction of the pair of second digital audio signals is temporarily stopped by a temporary stop instruction switch, starting from a position where the reproduction was temporarily stopped, and then causing the pair of third digital audio signals to be stored in the predetermined memory; and repeating said steps of receiving, converting, reproducing, and causing to complete a musical piece formed of a pair of multiplexed audio signals.

23. A portable mixing recorder comprising:

an input and conversion device that receives a maximum of a pair of analog audio signals and converts the pair of analog audio signals to a pair of first digital audio signals;

a reproduction device that reproduces a pair of second digital audio signals from a source file stored in a predetermined memory;

a recording instruction switch that is operable to instruct recording of the pair of first digital audio signals in the predetermined memory;

a recording-with-mixing instruction switch that is provided independently of said recording instruction switch, and is operable to instruct mixing of the pair of first digital audio signals and the pair of second digital audio signals into a pair of third digital audio signals, and recording of the pair of third digital audio signals in the predetermined memory; and a control device that causes the pair of first digital audio signals to be stored in the memory when said recording instruction switch is operated by a user, and causes the pair of first digital audio signals and the pair of second digital audio signals to be mixed into a pair of third digital audio signals, and the pair of third digital audio signals to be stored in the memory when said recording-with-mixing instruction switch is operated by the user, wherein said recording-with-mixing instruction switch and said control device are repeatedly operated to complete a musical piece formed of a pair of multiplexed audio signals.

24. A control method of controlling a portable mixing recorder, said method comprising the steps of:

receiving from the internal microphone a maximum of a pair of input analog audio signals;

converting the pair of input analog audio signal to a first digital audio signal;

reproducing a pair of second digital audio signals from a source file stored in a predetermined memory;

causing the pair of first digital audio signals to be stored in the memory when a recording instruction switch is operated by a user, causing the pair of first digital audio signals and the pair of second digital audio signals to be mixed into a pair of third digital audio signals when a recording-with-mixing instruction switch that is provided independently of said recording instruction switch is operated by the user, and then causing the pair of third digital audio signals to be stored in the predetermined memory; and repeating said steps of receiving, converting, reproducing, and causing to complete a musical piece formed of a pair of multiplexed audio signals.

25. A program embodied on a computer-readable medium for causing a computer to execute a control method of controlling a portable mixing recorder, the method comprising the steps of:

receiving a maximum of a pair of input analog audio signals;

converting the pair of input analog audio signals to a pair of first digital audio signals;

reproducing a pair of second digital audio signals from a source file stored in a predetermined memory;

causing the pair of first digital audio signals and the pair of second digital audio signals to be mixed into a pair of third digital audio signals when a recording-with-mixing instruction switch is operated by a user after reproduction of the pair of second digital audio signals is temporarily stopped by a temporary stop instruction switch, starting from a position where the reproduction was temporarily stopped, and then causing the pair of third digital audio signals to be stored in the predetermined memory; and repeating said steps of receiving, converting, reproducing, and causing to complete a musical piece formed of a pair of multiplexed audio signals.

* * * * *